United States Patent
Chen

(10) Patent No.: US 10,916,084 B2
(45) Date of Patent: Feb. 9, 2021

(54) TOUCH-TYPE CONTROL SYSTEM, CONTROL DEVICE AND MONITOR DEVICE FOR MERCHANDISE SECURITY

(71) Applicant: Hangzhou Langhong Technology Co., Ltd, Zhejiang (CN)

(72) Inventor: Binfeng Chen, Zhejiang (CN)

(73) Assignee: Hangzhou Langhong Technology Co., Ltd, Hangzhou (CN)

( * ) Notice: Subject to any disclaimer, the term of this patent is extended or adjusted under 35 U.S.C. 154(b) by 0 days.

(21) Appl. No.: 16/706,732

(22) Filed: Dec. 7, 2019

(65) Prior Publication Data
US 2020/0184756 A1    Jun. 11, 2020

(30) Foreign Application Priority Data

Dec. 7, 2018 (CN) .......................... 2018 1 1491693
Dec. 7, 2018 (CN) .......................... 2018 1 1491694
Dec. 7, 2018 (CN) .......................... 2018 2 2047116

(51) Int. Cl.
| | |
|---|---|
| *G07C 9/29* | (2020.01) |
| *H04W 4/38* | (2018.01) |
| *H04W 4/80* | (2018.01) |
| *E05B 73/00* | (2006.01) |
| *G05B 19/048* | (2006.01) |
| *G08B 13/24* | (2006.01) |
| *H04L 29/08* | (2006.01) |

(52) U.S. Cl.
CPC ............ *G07C 9/29* (2020.01); *E05B 73/0017* (2013.01); *G05B 19/048* (2013.01); *G08B 13/2402* (2013.01); *H04L 67/125* (2013.01); *H04W 4/38* (2018.02); *H04W 4/80* (2018.02)

(58) Field of Classification Search
CPC ............. G07C 9/29; H04W 4/38; H04W 4/80
USPC ....................................................... 235/383
See application file for complete search history.

(56) References Cited

U.S. PATENT DOCUMENTS

| | | | | |
|---|---|---|---|---|
| 2008/0246613 | A1* | 10/2008 | Linstrom | G08B 13/19695 340/572.4 |
| 2016/0335859 | A1* | 11/2016 | Sankey | G06Q 30/00 |
| 2019/0057563 | A1* | 2/2019 | Grant | G07C 9/00857 |

\* cited by examiner

*Primary Examiner* — Daniel A Hess

(57) ABSTRACT

The present invention provides a touch-type control system, a control device and a monitor device for merchandise security, including a controller and a monitor device, where the monitor device has an identifiable communication interface capable of communicating with the controller, and is configured to communicate with the controller via the identifiable communication interface and be initialized by a controller in communication therewith. The controller further comprises a touch-type communication interface for communicating with the monitor device, and is configured to be capable of controlling the monitor device initialized by the controller via the touch-type communication interface. In the system, the controller can communicate with the monitor device by means of a touch manner, thereby identifying, controlling and powering the monitor device, thereby solving the problem of the unification of power supply and data in the system.

19 Claims, 29 Drawing Sheets

| Parameter Name | Channel Number | Address Number | | |
|---|---|---|---|---|
| | | Communication Code | Device Code | Privilege Code |
| Parameter Length | 1 Byte | 2 byte | 2 byte | 1 byte |
| Function | used as communication channel of devices in security system | used as communication code of devices in security system | used for identification of devices in security system | used for identification of devices in security system |
| Parameter Setting | Controller Initialization Settings (to avoid mutual interference of multiple security systems in the same environment) | Controller Out-of-factory Settings (to avoid address repeation of multiple security systems in the same environment)) | | |
| Uniqueness | unique in security system | unique in security system | non-unique | non-unique |
| Default Parameter of Electronic Keys | 0x00 | 0x0001~0x9999 Out-of-factory Settings | 0x000000 | 0x00 |
| Default Parameter of Security Device Broadcasting Parameters of Electronic Keys | 0x00 | 0x00 | 0x000000 | 0x00 |

system identity number

FIG. 31

| Packet format | | | | | |
|---|---|---|---|---|---|
| Name | Preamble | Address | Packet control | Payload | Check |
| Length | 1 byte | 5 byte | 1 byte | 0~32 byte | 1 byte |

FIG. 32

| Payload format | | | |
|---|---|---|---|
| Name | Source Device code | Command | Data |
| Length | 2 byte | 1 byte | 0~29 byte |

FIG. 33

| Address Setting | | | |
|---|---|---|---|
|  | System Code | Device Code | Privilege Code |
| Point-to-point Communication | 0x1234 | 0x5678 | 0xFF |
| Privilege Broadcasting | 0x1234 | 0x0000 | 0x01 |
| System Broadcasting | 0x1234 | 0x0000 | 0x00 |

FIG. 34

TOUCH-TYPE CONTROL SYSTEM, CONTROL DEVICE AND MONITOR DEVICE FOR MERCHANDISE SECURITY

CROSS REFERENCE TO RELATED APPLICATIONS

The present application claims the benefit of Chinese Patent Application Nos. 201811491693.3, 201822047116.7 and 201811491694.8 filed on Dec. 7, 2018. All the above are hereby incorporated by reference.

TECHNICAL FIELD

The present invention relates to merchandise security, in particular to a control system of merchandise security. The control system can be used for retail or a sales place with a display merchandise, and effectively protects the retailed merchandise and the displayed merchandise from being stolen or damaged, and has a certain protection itself.

TECHNICAL BACKGROUND

With the development of the experiential service of a merchandise, the display and experiential functions of the merchandise are more open to a buyer or a potential buyer. Meanwhile, the demand for merchandise security continues to increase. On one hand, the various needs of an experiencer are met as much as possible, and the experiencer is shown with all functions and the most convenient side of the merchandise as much as possible; on the other hand, the possible theft by a person with a bad intention shall be on guard, and a hidden danger of the possible theft that may exist in the process of display and experience shall be reduced as much as possible and even eliminated.

At present, most merchandise sales places with experiential and display functions usually have many or even different categories of commodities. Each merchandise may be assigned to different store staff for protection and management. In this case, the store staff in charge of the commodities may only be responsible for the merchandise in an area under management. If the staff have the same control privilege over other areas under management, there may be hidden dangers. For example, a controller of a cabinet is connected to a controller of an adjacent cabinet, so that the controller of the adjacent cabinet can also control an antitheft device of the cabinet, which gives the clerk of the adjacent cabinet a great possibility and convenience to use his own controller to unlock the merchandise of the adjacent cabinet, thereby posing a security risk on the merchandise of the adjacent cabinet/the cabinet. In reality, internal piracy in some markets is one of the biggest security risks. Therefore, it needs to set privileges on the controller.

In the prior art, it is common to program each controller once, so that each controller has built-in security codes, which are unique to each controller. When it needs to control this controller, a user shall first perform match code. The merchandise can be controlled/unlocked only when the match code is a success. If the match code fails, the user will be rejected by the controller. The match code is taken as a prerequisite of control or in control. The security codes are used to limit the control that should not be needed, thereby improving security. However, this method is still a peer-to-peer method, and cannot form a corresponding management chain for regional management. Obviously, this method is very inconvenient to operate and use. Moreover, the security codes cannot be changed once written. If the user needs to adjust the placement of the merchandise or replace a display area, the user needs to replace a new controller system. Alternatively, if there is a new merchandise to enter an area, the user may write the original security codes to an antitheft device of the new merchandise, or further needs to update the codes of the entire system, which has poor extensibility and limit the scope of application.

SUMMARY

The technical problem to be solved by the present invention is to provide a touch-type control system for merchandise security to overcome the problems in the technical background, in which a controller can communicate with a monitor device by means of touch, thereby identifying, controlling and powering the monitor device, and solving the problem of the unification of power supply and data in a system.

In addition, the present invention also provides a grading control system for merchandise security, in which a controller can control monitor devices within a set range according to different privileges/level settings in the same system. The range controlled by the controller in the same system may be divided into different grades of control, respectively, which can realize grading control over different areas and embody management grading. Further, in this system, the controller can initialize and power the monitor device, solving the problem of the unification of the power supply and the data in the system.

In a first aspect of the invention, a touch-type control system for merchandise antitheft comprises:

a controller and a monitor device,

The monitor device has an identifiable communication interface communicable with the controller, and is configured to be communicable with the controller via the identifiable communication interface and to be initialized by the controller in communication therewith.

The controller also comprises a touch-type communication interface for communicating with the monitor device, and is configured to be capable of controlling the monitor device initialized by the controller via the touch-type communication interface.

The control comprises operations of locking, unlocking, placing in an operable state, and/or placing in an inoperable state.

Further, the identifiable communication interface is a wireless communication interface. In some preferred embodiments, the monitor device is initialized via a wireless manner.

Further, the touch-type communication interface is a wired communication interface. In some preferred embodiments, the monitor device is controlled via a wired manner. In some preferred embodiments, the monitor device initialized by the wireless manner can be controlled by the wired manner, which can be an electrical contact point or signal transmission formed by touch.

Further, the touch-type communication interface is configured to be communicable by non-directional contact of an outer surface or a portion of the outer surface. In some preferred embodiments, the touch-type communication interface is configured to have a touchable surface, which is exposed to the outer portion of the controller. The touchable surface can form an electrical connection or a signal connection when in contact. In some preferred embodiments, the monitor device is provided with the touch-type communication interface that cooperates with the controller, and is configured to establish a communication or electrical connection therebetween when the touch-type communication interface of the controller is in contact therewith. In some preferred embodiments, the non-directional contact means that such communication requires only surface contact only, and does not require rotation to a suitable direction. In some preferred embodiments, the touch-type communication interface on the controller and the monitor device can be in a matching shape, such as one that projects outwardly and the other that is recessed inwardly, which facilitates the coincidence of the two. Of course, such recesses or protrusions may be interchangeable, such as recessing on the controller and protruding onto the monitor device, or vice versa.

Further, the touch-type communication interface comprises at least two contact points. In some preferred embodiments, the two contact points can be circuited in and out. In some preferred embodiments, the circuit is a signal circuit. In some preferred embodiments, the circuit is an electrical circuit. In some preferred embodiments, this circuit is a combination of the signal circuit and the electrical circuit. In some preferred embodiments, more contact points may also be comprised. In some preferred embodiments, the contact point is only a representation. the area of the actual contact is not only the extent of the point, but may be a portion of the area or a small portion of the area, which is sufficient to form a communication.

Further, the touch-type communication interface comprises at least two contact assemblies, at least one of which is a magnetic contact assembly configured to be capable of being attracted and moved by a magnetic field.

Further, the controller comprises a housing, the magnetic contact assembly is mounted to the housing and has a contact surface exposed to the housing.

Further, the magnetic contact assembly comprises a resilient element.

Further, at least one of the contact assemblies is an annular contact assembly and/or a circular contact assembly.

Further, the annular contact assembly and the circular contact assembly are nested.

Further, at least one of the two contact points is an annular contact point or a circular contact point. In some preferred embodiments, one of the two contact points is the annular contact point, the advantage of which is that communication can be achieved regardless of the direction in which the contact is made, without the need for rotation. In some preferred embodiments, at least one of the two contact points is the circular contact point, which may cooperate with the annular contact point, for example, the circular contact point is sleeved inside the annular contact point.

Further, the controller is configured to be capable of powering the monitor device via the touch-type communication interface. As mentioned above, the controller can be built-in or externally connected with a power supply. In this case, for the entire touch-type control system, the controller can be the internal power supply, and through a power transmission module, powers other equipment, such as the monitor device, to realize internal power supply. Therefore, the monitor device does not need the external power supply. When the controller and the monitor device are in contact, the power is directly supplied to the monitor device. For the entire system, the number of the external power supplies can be reduced.

Further, the controller further comprises a logic control circuit configured to establish a power and/or communication connection between a power module and a security communication interface and/or a terminal communication interface.

Further, the touch-type communication interface comprises at least one identification circuit for identifying the monitor device. In some preferred embodiments, the identification circuit is configured to match with the monitor device. For example, after the communication is established, matching information is transmitted to the monitor device by the identification circuit. The monitor device (for example, the initialized device) that can be matched can match with information. With regard to the manners of identification and communication, reference may be made to specific embodiments of the present invention.

Further, the monitor device comprises at least one feature circuit that can be identified by the identification circuit. In some preferred embodiments, the monitor device matches with the identification circuit in the controller by the characteristic circuit, that is, the matching process is a process by which the identification circuit in the controller identifies the characteristic circuit in the monitor device.

Further, the controller is configured to be communicable with and capable of being set by a terminal device. The controller, via the communication device, such as WIFI, Bluetooth, etc., can be connected to the terminal device, such as a mobile phone or other smart devices. After the connection is established, the controller can be set by an application on the terminal device. For example, the controller is set to be on or off, or a control range of the controller is selected, for example, the controller is set to control the merchandise of a certain brand.

In this case, the controller can identify, control and even power the monitor device by means of touch. The touch type is simple and convenient to use. Further, the touch is a non-directional surface contact without a direction adjustment and with the position alignment. For the convenience of alignment, the present invention also designs mutually matching interfaces. In addition, the controller can also power the matching monitor device, thereby reducing the number of the external power supplies, and having a more reasonable and concise system layout According to a second aspect of the present invention, the present invention provides a touch-type control device for merchandise theft prevention, comprising:

at least one controller, configured to have a touch-type communication interface and configured to identify and initialize a monitor device through the touch-type communication interface and to control the initialized monitor device. The touch-type communication interface is configured to be communicable by non-directional contact of an outer surface or a portion of the outer surface.

In a third aspect of the invention, the present invention provides a touch-type control device for merchandise antitheft, comprising:

at least one controller, configured to have a touch-type communication interface and configured to identify and initialize a monitor device via the touch-type communication interface and to power the initialized monitor device. The touch-type communication interface is configured to be communicable by non-directional contact of an outer surface or a portion of the outer surface.

According to a fourth aspect of the present invention, the present invention provides a touch-type monitor device for merchandise antitheft, comprising:

a touch-type communication interface, wherein the touch-type monitor device is configured to be identified and/or initialized by a controller via the touch-type communication interface. The touch-type communication interface is configured to be communicable by non-directional contact of an outer surface or a portion of the outer surface.

According to a fifth aspect of the present invention, the present invention provides a touch-type monitor device for merchandise antitheft, comprising:

a touch-type communication interface, wherein the touch-type monitor device is configured to be identified and/or controlled by a controller via the touch-type communication interface. The touch-type communication interface is configured to be communicable by non-directional contact of an outer surface or a portion of the outer surface. The control comprises operations of locking, unlocking, placing in an operable state, and/or placing in an inoperable state.

According to a sixth aspect of the present invention, the present invention provides a grading control system for merchandise security, comprising:

at least two controllers and a plurality of monitor devices.

The controller comprises at least one main controller and at least one auxiliary controller.

The monitor device has an identifiable communication interface communicable with the controller, is configured to be communicable with the controller via the identifiable communication interface, and to be initialized by the controller in communication therewith;

The monitor device initialized by the auxiliary controller can be controlled by the main controller and the auxiliary controller.

The controller is configured to be capable of locking, unlocking, placing in an operational state, and/or placing an inoperable state on the monitor device.

The monitor device is in a security system and controls and manages the merchandise that need to be antitheft, so that the merchandise requiring the antitheft are in a safe or safe state. The controller can operate the monitor device to lock or unlock the monitor device (such as an item lock), or manage the state of the monitor device that is operable or inoperable, which is the control of the monitor device itself.

Further, the main controller is configured to have a control range not less than the auxiliary controller. Generally, the control range of the main controller is larger than that of the auxiliary controller. Alternatively, when there is only one controller, the main controller and the auxiliary controller are the same with the same control range. In some preferred embodiments, the main controller is often controlled by a staff member with a full store management grade, such as a business supervisor or a store manager. The main controller can control all the controllers of the entire sales/display place, with the widest range of control privileges. Since the auxiliary controller can be assigned to various regions or different brands or certain-types of commodities, such as a mobile phone/a notebook/a tablet computer, the control privilege of the auxiliary controller is limited to the merchandise/an exhibit placed in a certain area, or a certain brand of the merchandise/the exhibit, or a certain-type of merchandise. At this time, the control privilege of the auxiliary controller is smaller than that of the main controller.

Further, the control range comprises the number of the monitor devices that can be controlled, and/or the-type of the monitor device that can be controlled. Since each sales place may be managed by different people according to the brand, the region or the type of the merchandise, it is necessary to use the controllers with different control grades. In some preferred embodiments, the control range refers to the range of the monitor devices under control, such as the number of the monitor devices. The number of the monitor devices that can be controlled by the main controller is greater than that of the monitor devices that can be controlled by the auxiliary controller. Alternatively, the auxiliary controller may control a certain type of the monitor device, and the main controller may control a plurality of types of monitor devices. In some preferred embodiments, the control privilege of the main controller in the same security system is greater than that of the auxiliary controller.

Further, different auxiliary controllers are configured to be capable of having the identical, different or partially identical control ranges. As described above, each of the auxiliary controllers may control a different range (regions, brands or categories). Of course, it is also possible to control the same range, or the auxiliary controller can be cross-controlled. In some preferred embodiments, the control range of the controller can be differentiated according to the arrangement of the monitor device controlled by the controller or the merchandise corresponding to the monitor device in the sales place. For example, in some sales places, the arrangement of the merchandise is classified according to the brand. The monitor device for antitheft of these commodities may be classified according to the brand. A plurality of the auxiliary controllers is used to control the monitor devices corresponding to different brands of the commodities. One or a plurality of the main controllers is used to control all equipment or a plurality of the brands in the sales place, which can play the role of grading management. In other preferred embodiments, the control range of the controller may be differentiated according to the type of the merchandise itself. In some preferred embodiments, the same merchandise may be covered by a plurality of different categories. For example, a certain merchandise may belong to a certain brand and a certain kind of electronic merchandise. In this case, there may be two kinds of the auxiliary controllers that can control the merchandise. Therefore, the privilege of the auxiliary controller may be crossed and overlapped. The antitheft management of the merchandise within the overlapping range is shared by the two auxiliary controllers. In some preferred embodiments, when the controller is set based on grading, this overlapping manner can be avoided or employed as needed.

Further, each controller can independently control at least one monitor device. The controller can communicate with and control with at least one monitor device or a plurality of monitor devices.

Further, the controller comprises a power module configured to be connectable to an external power supply and receive power therefrom. The controller can be directly powered by the external power supply. It is of course not excluded that the controller can use the built-in power supply or other external power supply.

Further, the main controller is configured to be communicable with and capable of being set by the terminal device. The main controller can set the control range and the auxiliary controller within the range thereof by the terminal device.

Further, the auxiliary controller is configured to be communicable with the terminal device through the main controller and be capable of being set by the terminal device. In some preferred embodiments, the main controller is directly set by the terminal device. The auxiliary control is connected to the terminal device through the main controller. After the main controller is set, the terminal device can set the auxiliary controller within the range of the main controller.

Further, the controller is configured to have a power transmission module and be capable of providing power to the monitor device controlled thereby. As described above, the controller may have the built-in or external power supply, in which case, for the entire grading control system, the controller can be one internal power supply and can transmit power to other devices, such as the monitor device, through one power transmission module, to achieve internal power supply. Therefore, the monitor device does not need the external power supply, which can reduce the number of the external power supplies for the entire system.

In this case, the present invention provides a security system, which is capable of configuring two controllers of different privilege, that is, a main controller and an auxiliary controller, and controlling different grades of security antitheft devices. Each grade can form one overall area in effective control. Different grades can have a common upper grade. each different upper grade can also form the overall area in the effective control, achieving a flexible multi-grade control mode. Moreover, the multi-grade control is based on the privilege setting of the controller, and does not place a security code or set a controlled privilege for each controlled object. Therefore, if a new merchandise is added or a region is changed, the privilege does not need to be changed overall. The controlled object can be added or deleted at any time, which has very high operability and extensibility and wide scope of use.

According to a seventh aspect of the present invention, the present invention provides a grading control device for merchandise security, comprising at least one main controller and at least one auxiliary controller, The main controller is configured to be communicable with, initialize and control the monitor device.

The auxiliary controller is configured to be communicable with, initialize and control the monitor device.

The main controller is configured to have a control range greater than the auxiliary controller.

In this case, the present invention provides a control device that can be configured in a set in a system. In a set of system, there are at least two control devices. Different control devices have different control ranges, thereby forming a system control layout with privilege and a grade to make system control more secure and reliable.

The beneficial effects of the invention are:
(1) The controller provided by the present invention can identify, control and even power the monitor device by the touch method. The touch method is simple and convenient to use. Further, the touch is a non-directional surface contact without direction adjustment and with position alignment. For the convenience of alignment, the present invention also designs mutually matching interfaces. In addition, the present invention can also supply power to the matching monitor device through the controller, thereby reducing the number of the external power supplies, and having a more reasonable and concise system layout.
(2) The controller can be connected with the external power supply directly or indirectly, and can power the controlled monitor device while powering the controller. The monitor device can be configured to be directly powered by the controller without the external power supply, which reduces the number of the external power supplies and adapters, and has a more compact overall structure of the antitheft system and components more closely combined therebetween.
(3) The monitor device performs a plurality of functions of the existing antitheft device; for example, the alarm device can receive the security signal of a sensor and perform an alarm function. In addition, the monitor device has other functional modules; for example, a detection module can detect whether the sensor sends a security signal; an induction module can sense whether the merchandise is experienced (taken and/or put down); the control module receives the control signal and the initialization signal of the controller, and a communication interface is configured to communicate with other devices. In addition, the monitor device further comprises one storage device. The storage device can record events related to information received by these modules for a collection device to call at any time. The collection device further can upload the information of the monitor device to a cloud server through the connection with a cloud-connected device to provide a basis for the big data of the security system.
(4) The controller can be connectable to the terminal device, and is controlled and set by the terminal device. The terminal device only needs to be connected with the controller, and does not need to set each monitor device, which has convenient operation and use. Moreover, the main controller is directly set by the terminal device, and the auxiliary controller is set by the main controller, thereby ensuring clear privilege on the one hand and ensuring communication security inside the system on the other hand.
(5) The present invention is configured with two controllers in different privileges, that is, the main controller and the auxiliary controller, which can control different grades of security antitheft devices. Each grade can form one overall area in the effective control. Different grades have a common upper grade. Each different upper grade can also form one overall area in the effective control, realizing a flexible multi-grade control mode.
(6) The present invention may comprise multi-grade control based on the privilege setting of the controller, without placing a security code or setting a controlled privilege for each controlled object. Therefore, if a new merchandise is added or a region is changed, the privilege does not need to be changed overall. The controlled object can be added or deleted at any time, which has very high operability and extensibility and wide scope of use.

BRIEF DESCRIPTION OF DRAWINGS

FIG. 31 is a structural diagram of a system identification code according to the present invention.

FIG. 32 is a diagram of a format of a packet according to the present invention.

FIG. 33 is a diagram of a format of a payload according to the present invention.

FIG. 34 is a diagram of an example of communication address setting according to the present invention.

DETAILED DESCRIPTION

The embodiments of the present invention are further described in detail below with reference to the accompanying drawings. It should be noted that the embodiments are only illustrative of the present invention and should not be construed as limiting the present invention.

The technical terms involved in the present invention are explained in conjunction with the embodiments, and the terms are explained in order to enable a person skilled in the art to more accurately understand the technical solutions of the present invention. The explanation of the terms does not limit the scope of protection of the present invention.

Merchandise Security

Figure 15:
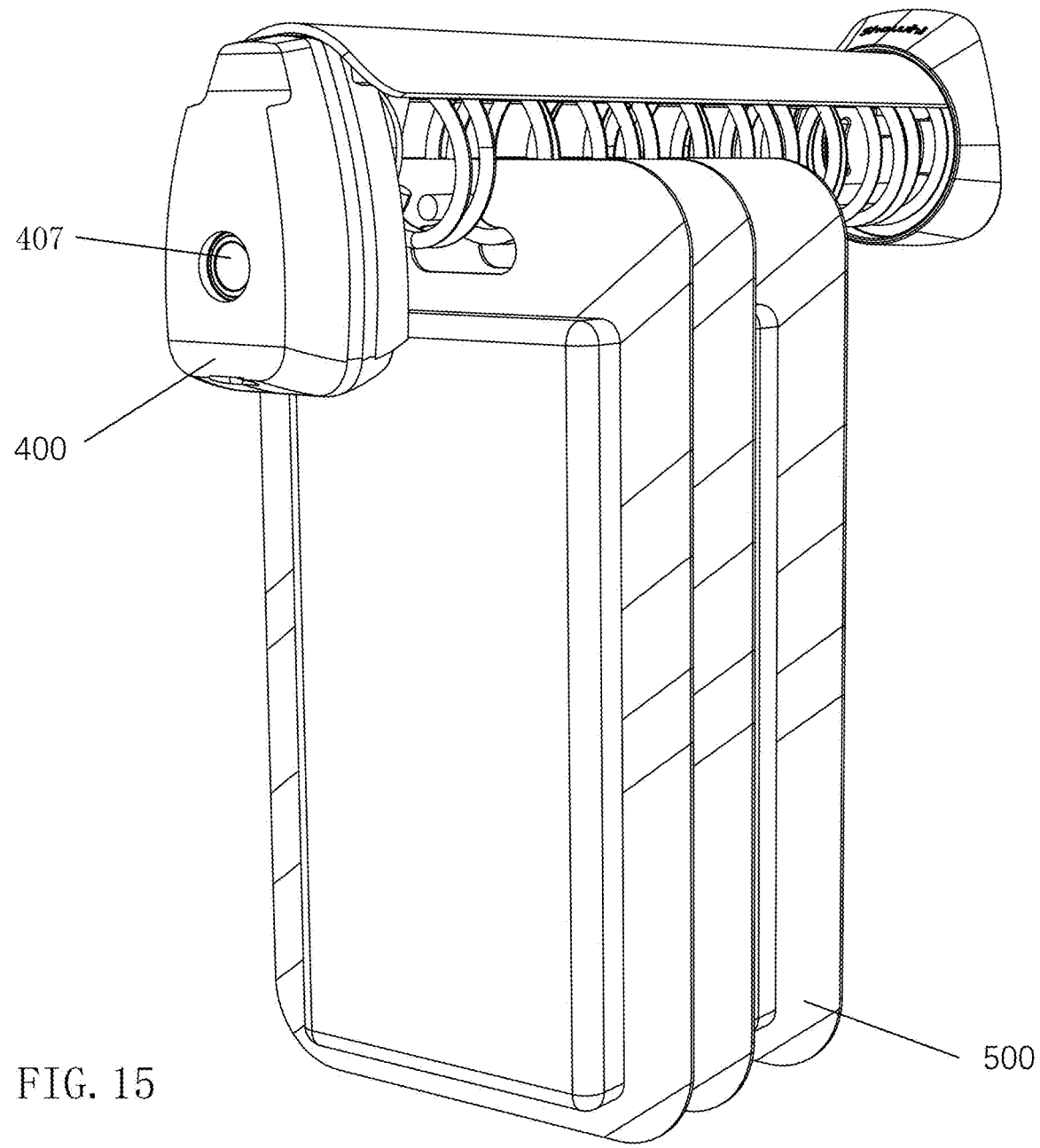
FIG. 15 is a diagram of an application of a monitor device to a merchandise according to the present invention.

The merchandise security in the present invention can be used for a plurality of commodities that need to be functionally displayed to a purchaser or a potential purchaser, such as an electronic merchandise. A plurality of functions of these commodities need to be understood by the user only when the commodities are used. These commodities usually have a plurality of man-machine interaction interfaces. An exhibited person can contact and use all or part of the functions of these commodities by demonstration or display in a certain range, so as to understand the performance of the merchandise. In the industry, this kind of merchandise with a functional display demand is also called as the merchandise with experiencing demand; that is, the exhibited person can operate and experience the merchandise displayed under limited conditions and scope. Therefore, these commodities can be experienced or directly contacted by the experiencer. The experiencer can use the merchandise within the limit defined by the seller or the owner of the merchandise, such as in a sales place, but cannot take the merchandise away from an experiential place. Since the ownership of the displayed merchandise belongs to the seller or the owner, the merchandise needs to be taken with antitheft measures. These antitheft measures do not limit the use of the experiencer, but only limit the experiencer to take the merchandise away from the place. In some cases, these antitheft measures need to be considered as far as possible not to hinder the use of the experiencer, so that they can get better experience, which is different from the antitheft measures of items in volume sales. The antitheft measures of the merchandise can also be taken in some ways that do not require experience and just display for sales; for example, a rack shown in FIG. 15 is also covered with the merchandise security. In addition, the merchandise security can also comprise an area that does not require experience or display, such as a storage area of the merchandise, such as a cabinet shown in FIGS. 16-17, wherein if the merchandise is stored therein, the area can also be covered by a security lock. This does not set a merchandise lock on the merchandise itself, but a plurality of controllable antitheft system or antitheft settings are used to perform antitheft from an overall layout and the ability to remotely or close to unlock the merchandise. In a sense, the antitheft can be an antitheft concept in a place.

Sensor

A sensor is often used to sense a certain signal or a certain state. The sensor is dedicated to the merchandise; that is, the antitheft of the above-mentioned merchandise. The sensor may be an induction line, can be a device with an induction element, or an element with an induction function that is integrated on a charging interface or an adapter or an antitheft host, so as to be capable of sensing a signal and determining whether the displayed merchandise is in a safe state. The sensor can be connectable to the merchandise. In some preferred embodiments, the sensor can be placed on the monitor device 400 along with the merchandise. When the sensor is not detached from the merchandise but is detached from the monitor device 400, the merchandise can be considered to be in a picked-up state. However, since the sensor is not detached the merchandise, the merchandise is still considered safe at this time. In some preferred embodiments, in this case, the merchandise can be determined to be in the state of being experienced.

Safe State/Unsafe State

The safe state or the unsafe state in the present invention refers to a state of the displayed merchandise, in particular to a state of the displayed merchandise in association with the antitheft device when the antitheft device is installed. In general, a state in which the merchandise is considered not to be stolen is called the safe state. A state in which the merchandise may be stolen is called the unsafe state. It is determined whether the antitheft measures are intact, and whether the merchandise are under the protection of antitheft measures. If so, the state is considered to be the safe state; if not, the state is considered to be unsafe state. That is to say, this safe or unsafe state can be relative to the antitheft measures. For example, if the antitheft measure is that the displayed merchandise is always connected to a charging interface, the sensor detects the charging interface. It is determined whether the charging interface is always connected to the merchandise. If so, the merchandise is in the safe state; if not, the merchandise is in the unsafe state. Alternatively, if the antitheft measures are that the merchandise are always kept in a charged state, the sensor detects whether a charging cable of the merchandise keeps in power transmission. If so, the merchandise is in the safe state; if not, the merchandise is in the unsafe state. Alternatively, if the antitheft measure is that the merchandise is clamped by a clamping device, the sensor detects whether the merchandise is in a clamping space or whether the merchandise is in contact with the clamping device or installed. If so, the merchandise is in the safe state; if not, the merchandise is in the unsafe state; and so on.

Unauthorized Removal

In the present invention, non-authorization is relative to authorization. Since there are two ways of locking and unlocking in the field of merchandise security, in the process of displaying the merchandise, the merchandise is usually in a locked state in which the merchandise is not stolen. However, in addition to this case, the merchandise may be actively taken off from the antitheft device by a merchant. For example, when a merchandise is out of season and has not been sold, the corresponding exhibit will be removed. This involves the replacement of the merchandise. Alternatively, when the exhibit has a quality problem and need to be repaired, the merchandise may also need to be removed from the antitheft device. When the displayed merchandise is replaced or repaired, the authorized staff (merchant) removes the merchandise from the antitheft device. This removal is called as an authorized removal; otherwise, the removal is considered as an unauthorized removal.

Security Signal

A security signal is also a well-known concept in the field of the merchandise security. When the merchandise is in the unsafe state, a certain component in the merchandise security system issues the security signal. The security signal can be an induction signal or an electrical signal or a digital signal, which can be triggered by many methods/events in the prior art. For example, the event may be a physical-connection disconnection or a circuit disconnection. A trigger method may be that an induction component is sensed to transmit an induction signal to the corresponding device. After receiving the induction signal, the corresponding device can issue the security signal according to the most basic logic (yes/no). In the field of the merchandise security, the usual triggering method may be to disconnect a connection and a charging connection. If the merchandise is removed from a certain mounted component, or if a certain setting is destroyed, the security signal can be triggered, which is conventional in the art.

Cable

A cable is a concept of connection and/or transmission. In some cases, the cable may be a purely mechanical connection that connects two commodities. In some cases, the cable can provide power transmission (strong current), which establishes a power connection for two parties connected by cable. One of the parties can provide power to the other, or both parties can have power transmission. In some cases, the cable can provide data transmission (comprising a weak current) and power and data connection for both parties connected by the cable. One of the parties can provide power or transmit data signals to the other; or both parties can have power and data signals transmitted to each other. In some cases, the power transmission in the cable can be used as an induction loop, that is, a determination factor for detecting whether the cable is turned on or off. For example, when there is the power transmission in the cable, the induction loop can be considered to be unblocked, and the cable is in a normal connection state. At this time, if the cable is connected to the merchandise and an antitheft host, the merchandise can be considered to be in the safe state. Alternatively, when there is a signal transmission in the cable, it can be considered that the induction loop is unblocked and the cable is in the normal connection state. If the cable is connected to the merchandise and the antitheft host at this time, the merchandise can be considered to be in the safe state. In this case, the cable can function as induction, equivalently functioning as part of the sensor. At this time, the cable can be used as part of the sensor.

Terminal Device

In the general sense, a terminal device refers to an electronic device that is input or output to other devices via a communication facility. The terminal device is usually placed in a convenient place where the terminal device can be connected to a remote computer by means of a communication facility, and mainly consists of a communication interface control device and a dedicated or selected input/output device.

Figure 11:
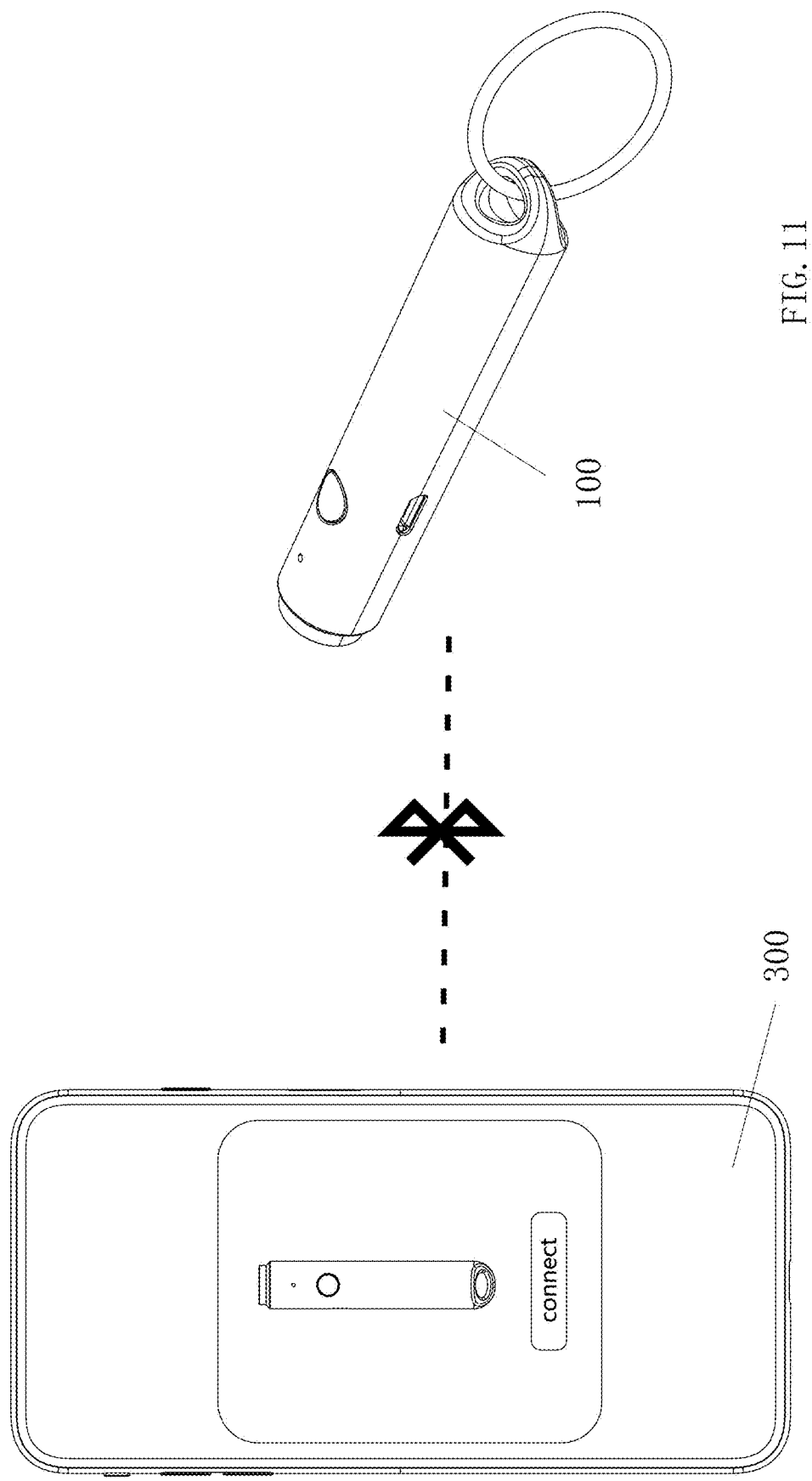
FIG. 11 is a diagram of a connection manner of a controller and a terminal device according to the present invention.
Figure 12:
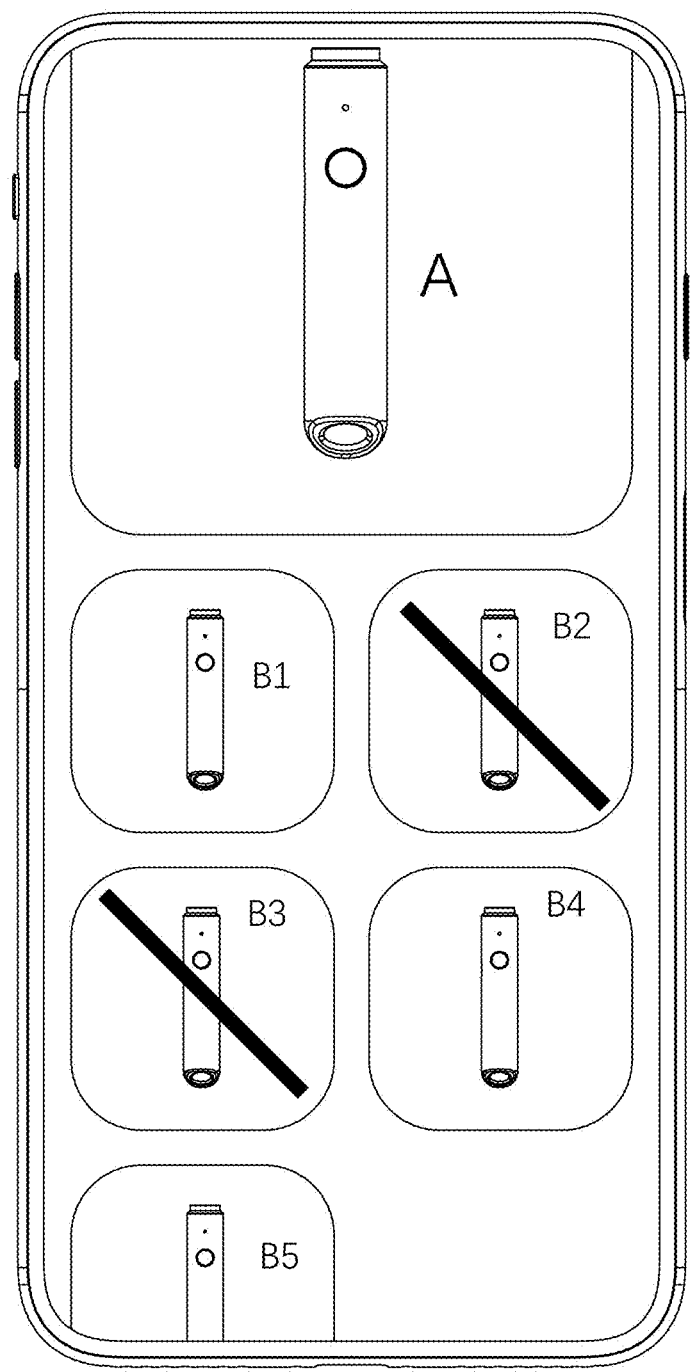
FIG. 12 is a diagram of a setting of a controller in a terminal device according to the present invention.
Figure 13:
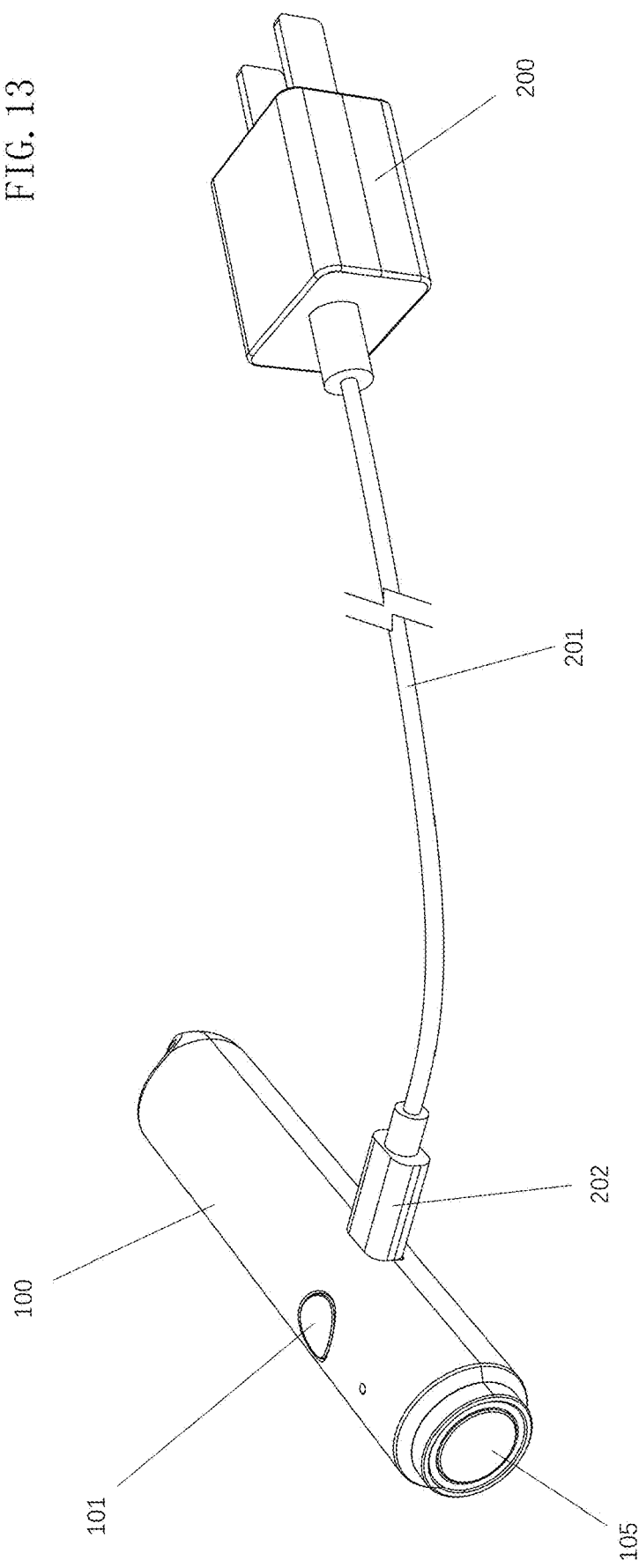
FIG. 13 is a diagram of an electrical connection of a controller according to the present invention.
Figure 14:
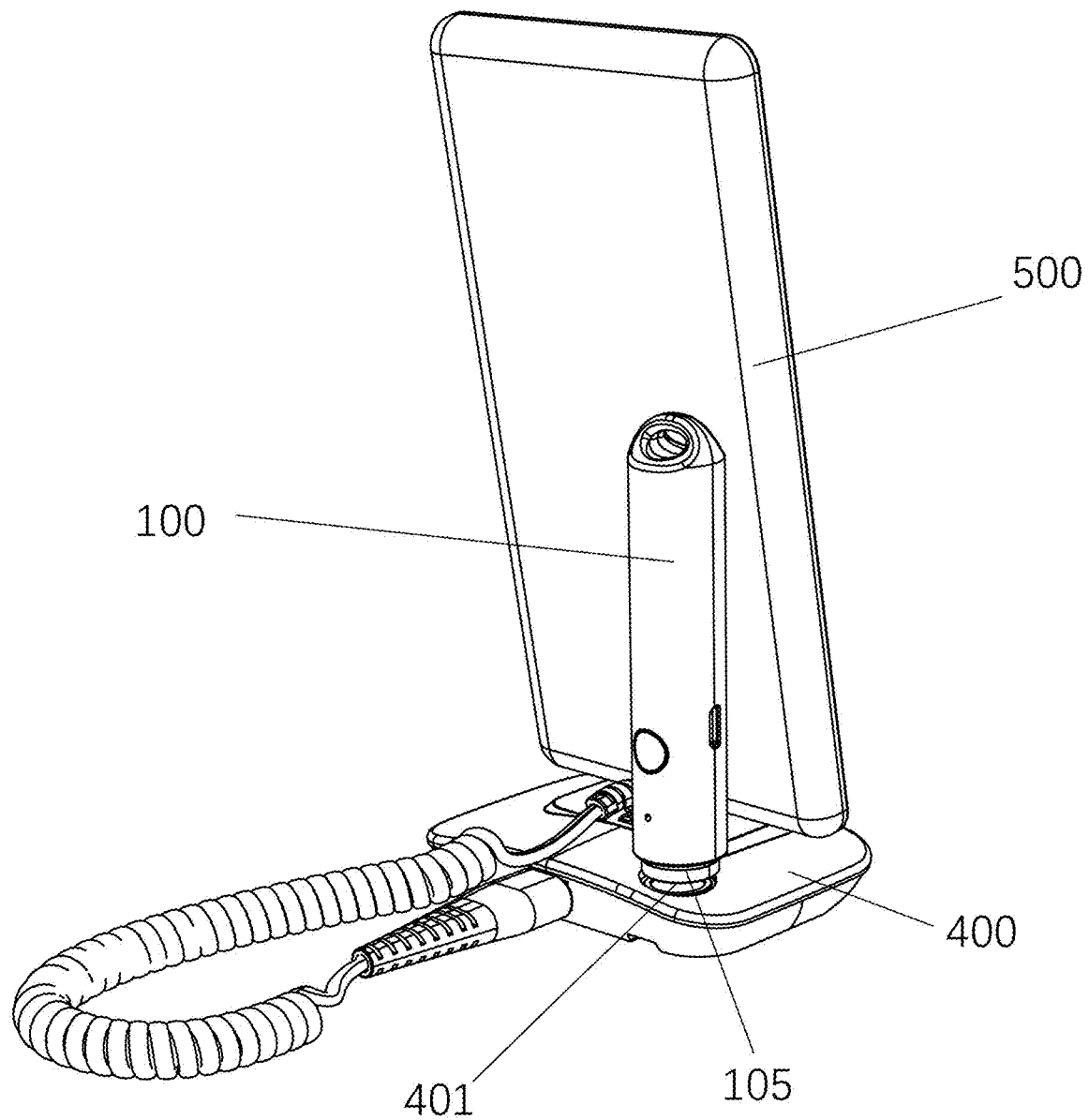
FIG. 14 is a diagram of a controller charging a monitor device according to the present invention.
Figure 17:
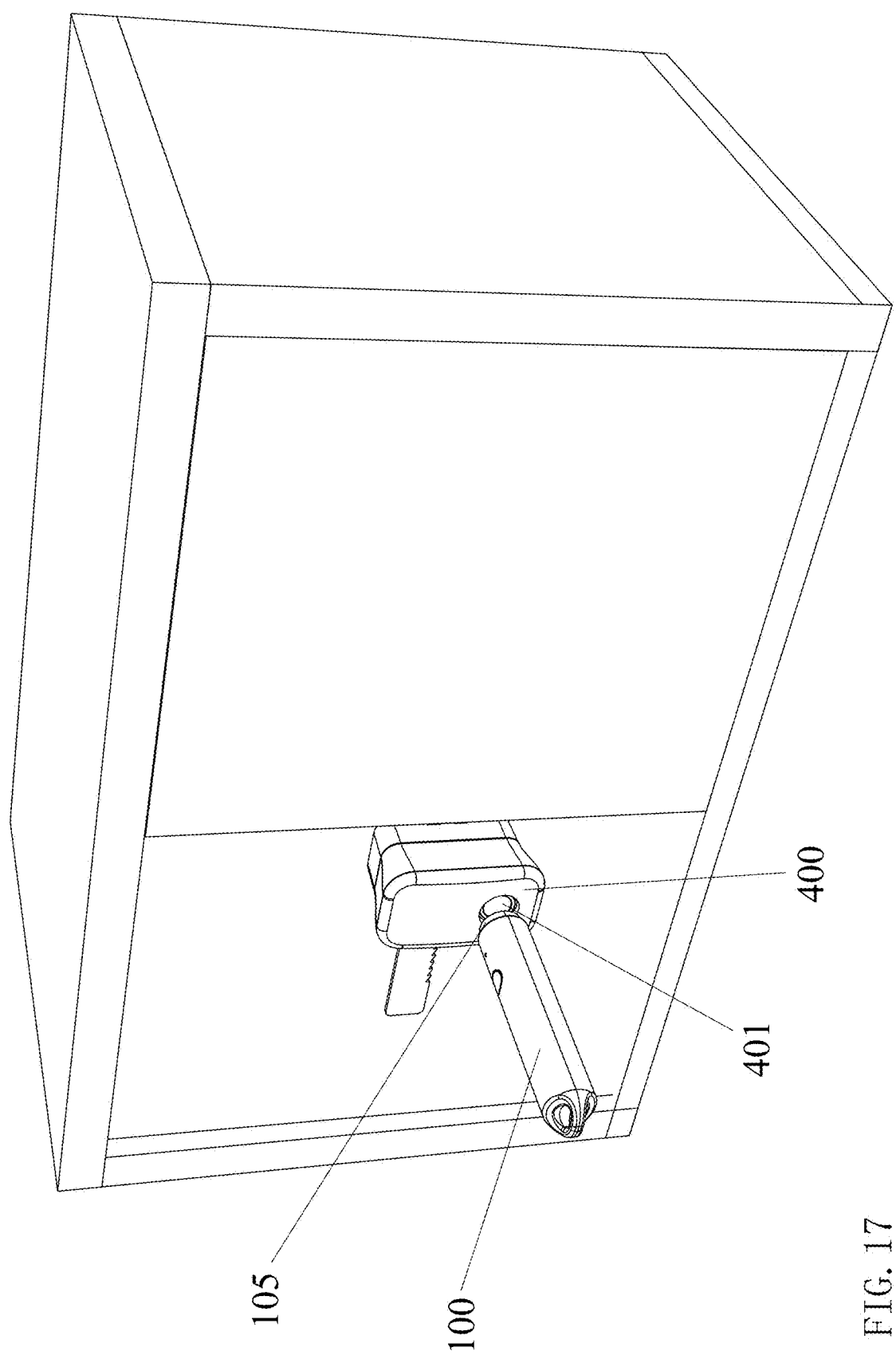
FIG. 17 is a diagram of the management/control of a monitor device by a controller based on an application to a merchandise of FIG. 16.

The terminal device may have an operation interface capable of having man-machine interaction control, which is convenient for setting and operation by the user. In other preferred embodiments, the terminal device may also take the form of a control button. Software can be installed in the terminal device to turn the controller on and off and set a control area, the situation shown in FIG. 11 is an example for this. For example, on a display screen of the terminal device shown in FIG. 12, a connected/communicable controller is displayed. The controller connected to the terminal device can be set by the terminal device. For example, the control interface shown in FIG. 12, a total of one main controller A and a plurality of auxiliary controllers B1, B2, B3, B4, and B5 are set, wherein the auxiliary controllers B2 and B3 are in an off state, and the other controllers are all in an on state. In some preferred embodiments, the control range of the controller can also be set. In some preferred embodiments, after the terminal device 300 is connected to the controller 100, the monitor device 400 can also be partially controlled by the interface of the terminal device 300, for example, the control of an alarm volume in the monitor device. The alarm volume of the monitor device 400 can be adjusted via the operation interface of the terminal device Controller In the field of the merchandise security, the controller is an unlocker to some extent. When the antitheft device such as an alarm alarms, the alarm can be turned off by the controller to stop alarming, which is one function of the controller. In some cases, the antitheft device may set a switch, and the antitheft function can be activated only when the switch is turned on. When the switch is turned off, the alarm is stopped. In some cases, the controller can also control the on and off. Most controllers can function as the unlockers and switches. In the present invention, the controller may comprise not only some of the functions described above, but also some other functions. For example, in some embodiments, the controller may comprise a power module, which may be externally charged, is a charging method of the controller as shown in FIG. 13, and can be connected to the interface of the controller through a power adapter. In some preferred embodiments, the controller may also comprise an externally powered module that supplies the own electrical energy thereof to the monitor device controlled by the controller. In some preferred embodiments, the power supply of the controller may be implemented by means of an electrical contact point or by wirelessly charging, which is an optional mode of the present invention. The present invention does not limit which manner the controllers is powered. However, the controller provided by the present invention may comprise a function of providing power. In some preferred embodiments, the controller may have a power conversion module or a power control module, by which the externally input electrical energy is converted to electrical energy that can be used inside the controller, or the converted electrical energy is used to power the monitor device controlled by the controller. As shown in FIGS. 14 and 17, the controller can be in contact with and be electrically connected to the electrical contact point associated with the monitor device to power the monitor device. In other preferred embodiments, the controller can also power the monitor device by wirelessly charging, so that the monitor device does not need to be connected to the external power supply.

Figure 2:
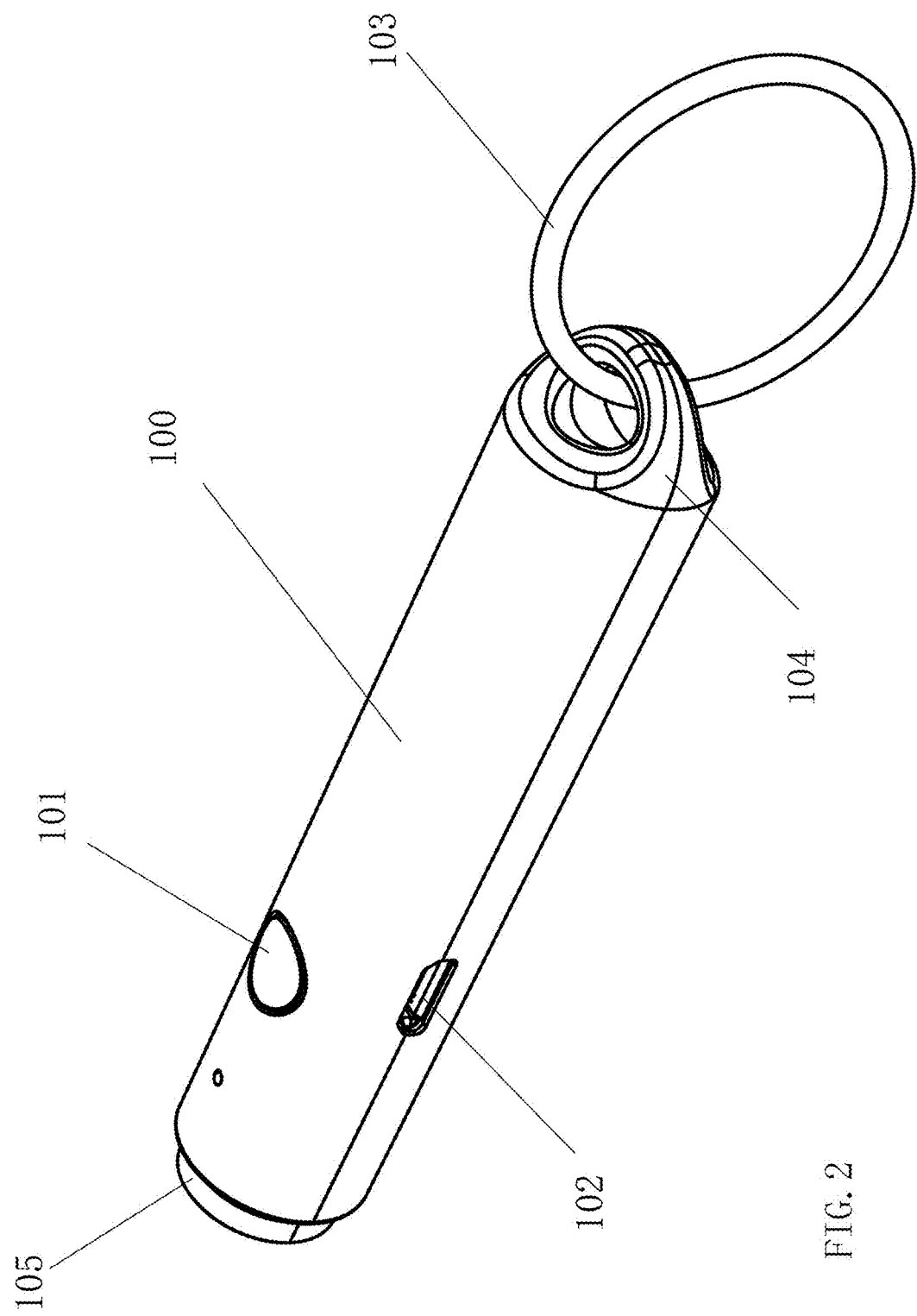
FIG. 2 is a structural diagram of a controller according to the present invention.
Figure 3:
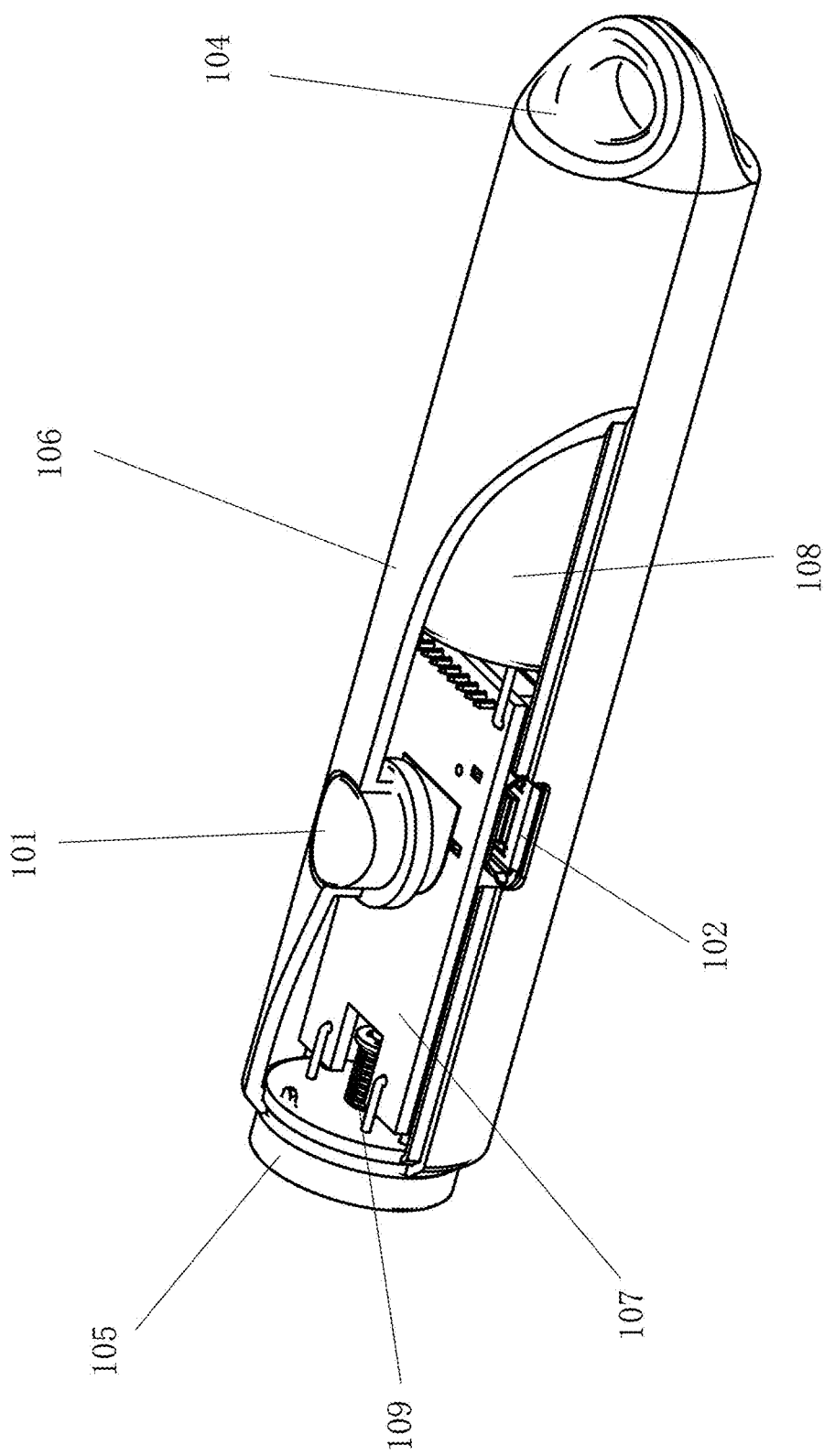
FIG. 3 is a diagram of an internal structure of a controller according to the present invention.
Figure 4:
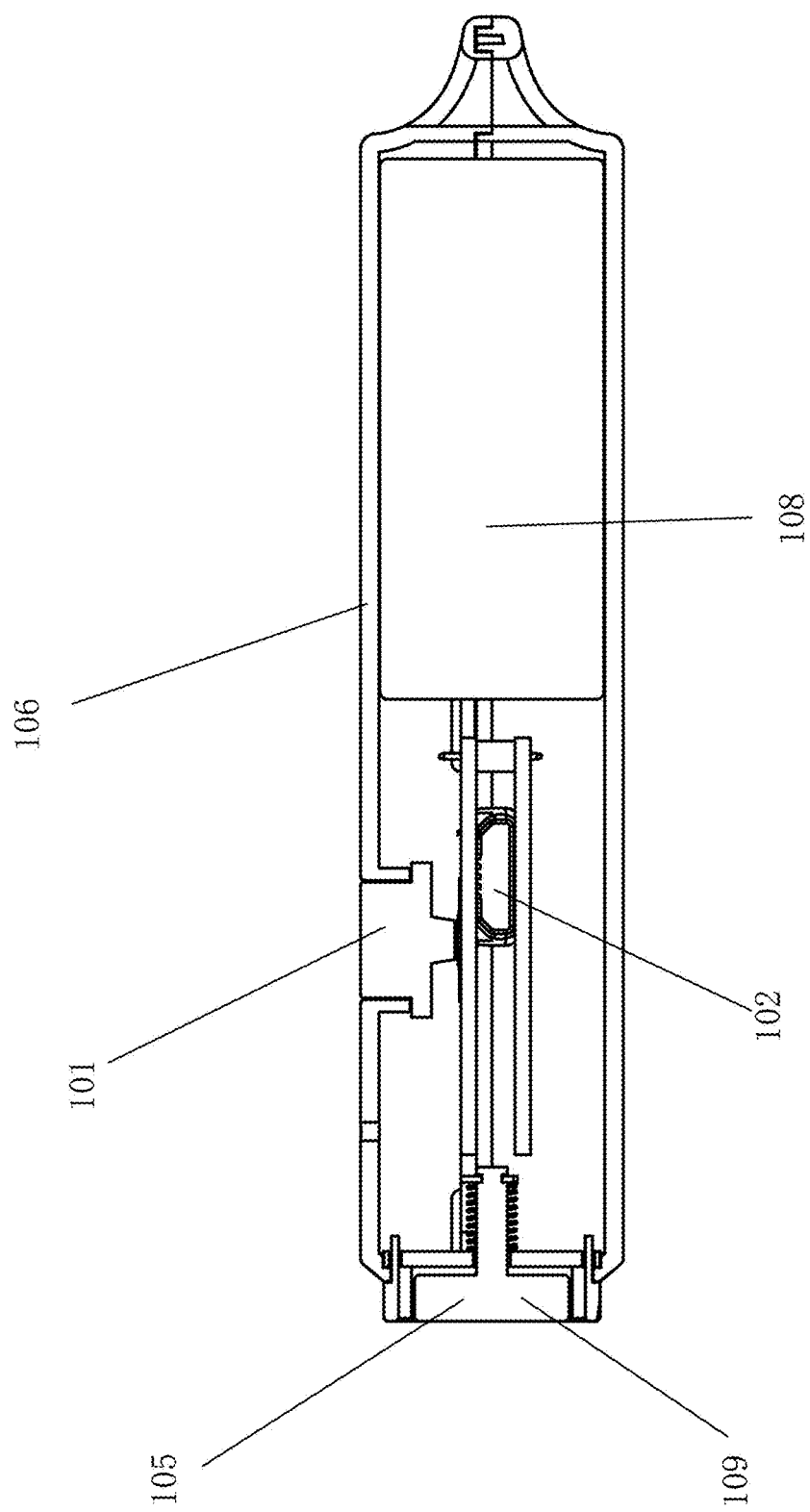
FIG. 4 is a sectional view of a controller according to the present invention.
Figure 5:
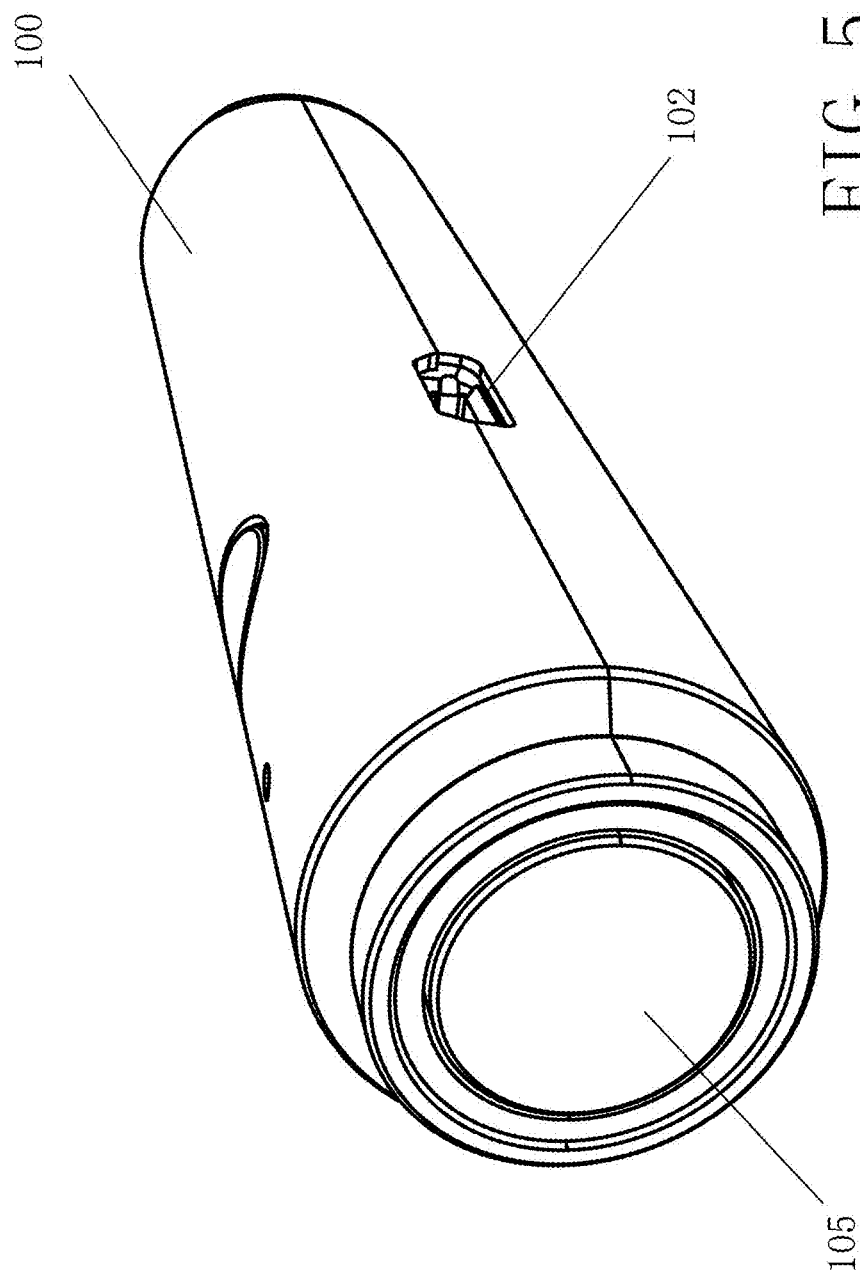
FIG. 5 is a diagram of an electrical connection of a controller according to the present invention.

The controller may have a hardware device, such as the form shown in FIG. 2. The controller 100 may be equipped with at least one button 101, which may be used to turn the controller 100 itself on or off, and may also be used to start or shut down the control of the monitor devices by the controller 100. In some preferred embodiments, the controller 100 can also have the charging interface 102, as shown in FIG. 13, which can be powered by the power adapter 200. The power adapter 200 can be connected to one cable 201. The cable 201 is connected to the charging interface 102 of the controller 100 by one power supply interface 202 to power the controller. In some preferred embodiments, the charging interface 102 can also serve as a data interface for the controller to communicate externally. In some preferred embodiments, the controller 100 can also be provided thereon with a pulling ring or a hanging ring 103. The controller 100 is provided with a nesting portion 104 in which the hanging ring 103 can be rotated.

Figure 6:
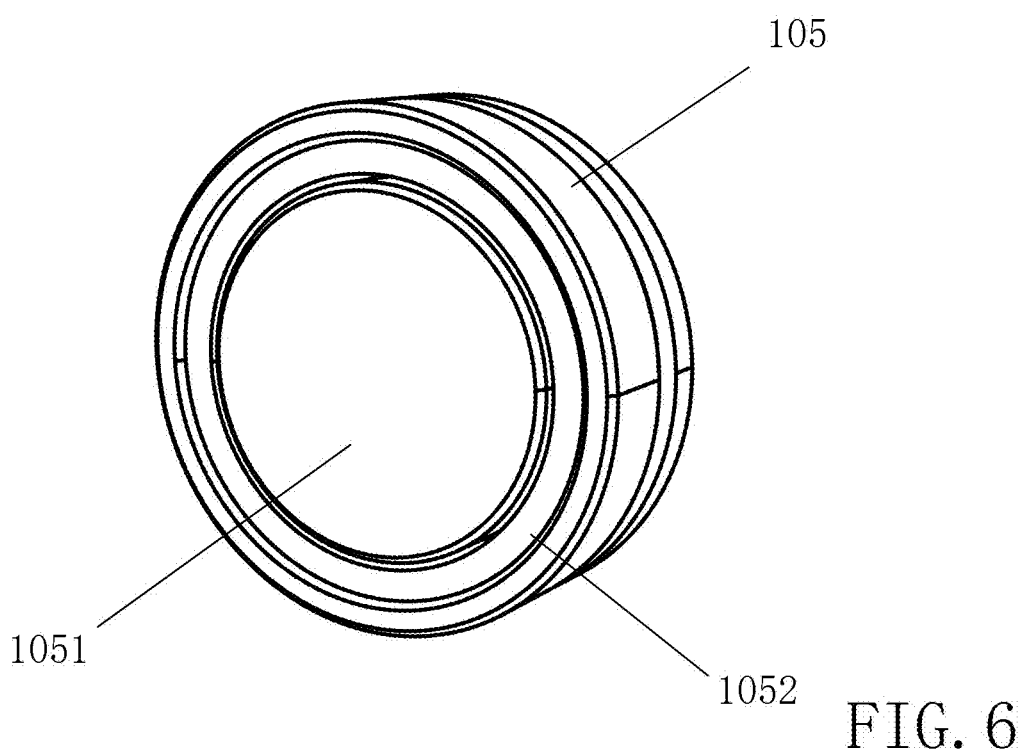
FIG. 6 is a diagram of a connector of an electrical connection of a controller according to the present invention.

In some preferred embodiments, the controller 100 can have an electrical connector 105 that can comprise at least two electrical contact points 1051 and 1052. In some preferred embodiments, as shown in FIG. 6, the electrical contact point 1051 is a circular portion in the middle, which can be used as a positive pole portion. The electrical contact point 1052 is an annular portion around the periphery of the electrical contact point 1051, which can be used as a negative pole portion. Of course, positive and negative poles can also be interchanged. The corresponding electrical contact point can also be set on the monitor device. The two electrical contact points 1051 and 1052 can respectively make contact with and be electrically connected to the corresponding electrical contact points on the monitor device to, thereby powering on a power supply circuit, and powering the monitor device by the controller 100. The advantage of using the annular or circular electrical contact points is that it is not necessary to align the position of the electrical contact points on a circumference, but only to find the matching electrical contact points on the monitor device. However, if the electrical contact point is point-shaped or strip-shaped, after the electrical contact point is found, it may be necessary to rotate the controller 100 to achieve the matching of the electrical connection. In some preferred embodiments, the electrical connector 105 can be arranged at one end of the controller 100, such as the end opposite the hanging ring 103, for ease of operation. In some preferred embodiments, the controller 100 can also be arranged in a square shape, which makes it easier to align the position. In some preferred embodiments, the electrical contact points can also take other shapes or be arranged elsewhere in the controller.

Figure 16:
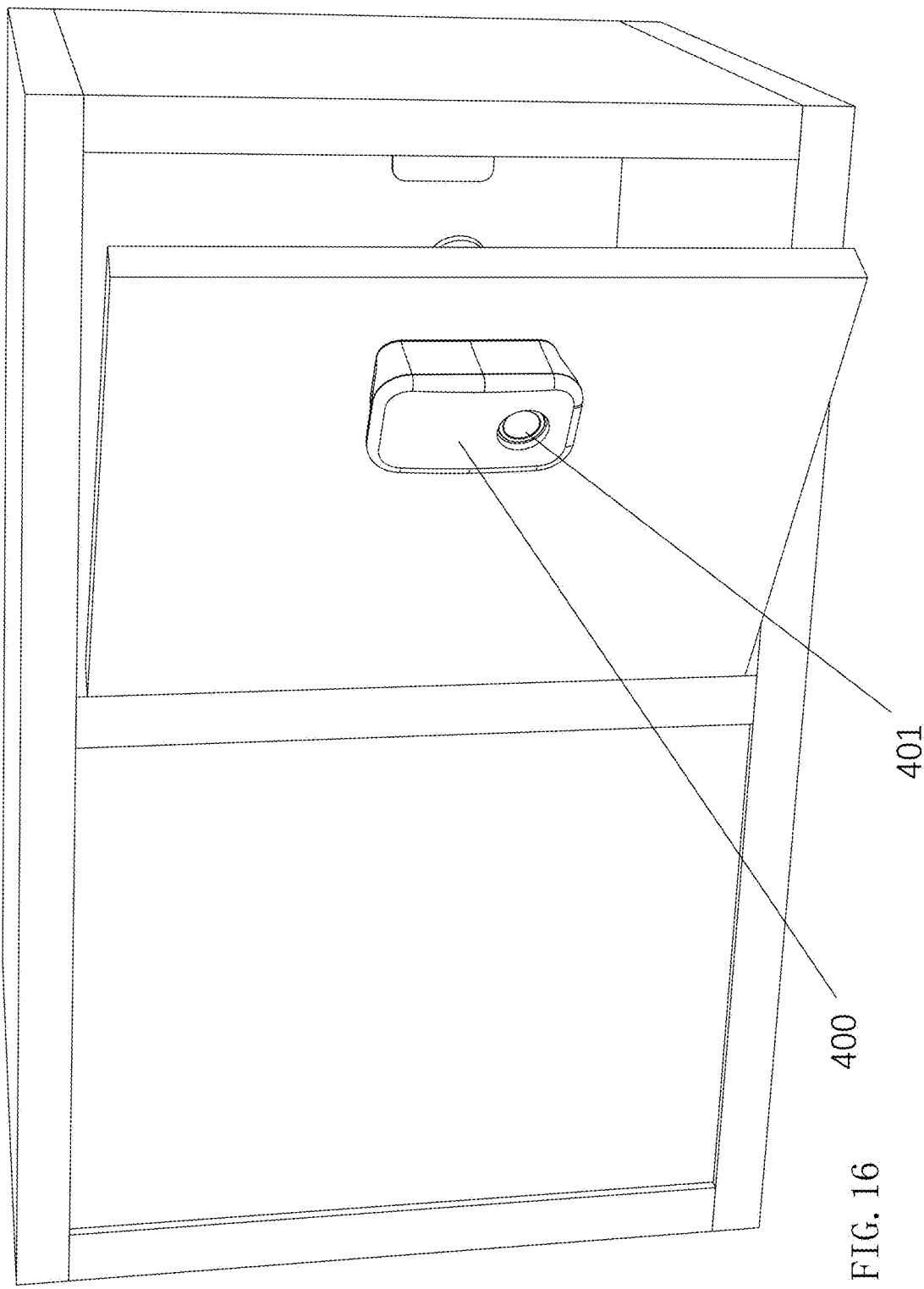
FIG. 16 is a diagram of an application of a monitor device to another merchandise according to the present invention

FIGS. 14 and 17 show the manner in which the controller 100 performs contact type charging to the monitor device 400. In FIG. 14, the merchandise 500 is a mobile phone, and the monitor device 400 is a security base that is electrically connected to or supports the mobile phone. The security base is provided with an electrical connection hole 401 that cooperates with the electrical connector 105 of the controller. In some preferred embodiments, in order to facilitate matching and position the electrical contact points, the electrical connection hole 401 is recessed inwardly to facilitate the matching with the electrical connector 105. As previously described, in some preferred embodiments, since the annular electrical contact points 1051 and 1052 are arranged, the electrical connector 105 and the electrical contact hole 401 need to be aligned to achieve electrical connection thereof. FIGS. 16-17 show an application of the controller 100 in another mode. In the scenario shown in FIG. 16-17, the controller 100 is applied to a merchandise cabinet. the monitor device 400 is a lock of the merchandise cabinet. Similarly, the electrical connection hole 401 that is matched with the electrical connector 105 of the controller is arranged on the lock. the power supply, unlocking and other control of the lock can be realized by the electrical contact. In the scenario shown in FIG. 14, unlocking and control can also be performed by means of contact.

In other preferred embodiments, as shown in FIGS. 2-5, the controller 100 can comprise at least two housings that are assembled together. The housing 106 encloses other components in the controller 100 therein. In other preferred embodiments, one logic control circuit board 107 is arranged within the controller 100. The electrical connector 105 can be electrically connected to the logic control circuit board 107. In other preferred embodiments, an energy storage module 108 for storing electrical energy may be arranged in the controller 100 and may also be electrically connected to the logic control circuit board 107. In some preferred embodiments, the charging interface 102 is electrically connected to the logic control circuit board 107. The power accessed from the charging interface 102 is transmitted to the energy storage module 108 and the electrical connector 105 via the logic control circuit board 107, respectively. In some preferred embodiments, the energy storage module 108 may not be arranged, in which case the controller 100 shall be powered on at all times. In some preferred embodiments, the electrical connector 105 can be fixed to the controller 100 via a fastener 109.

Figure 8:
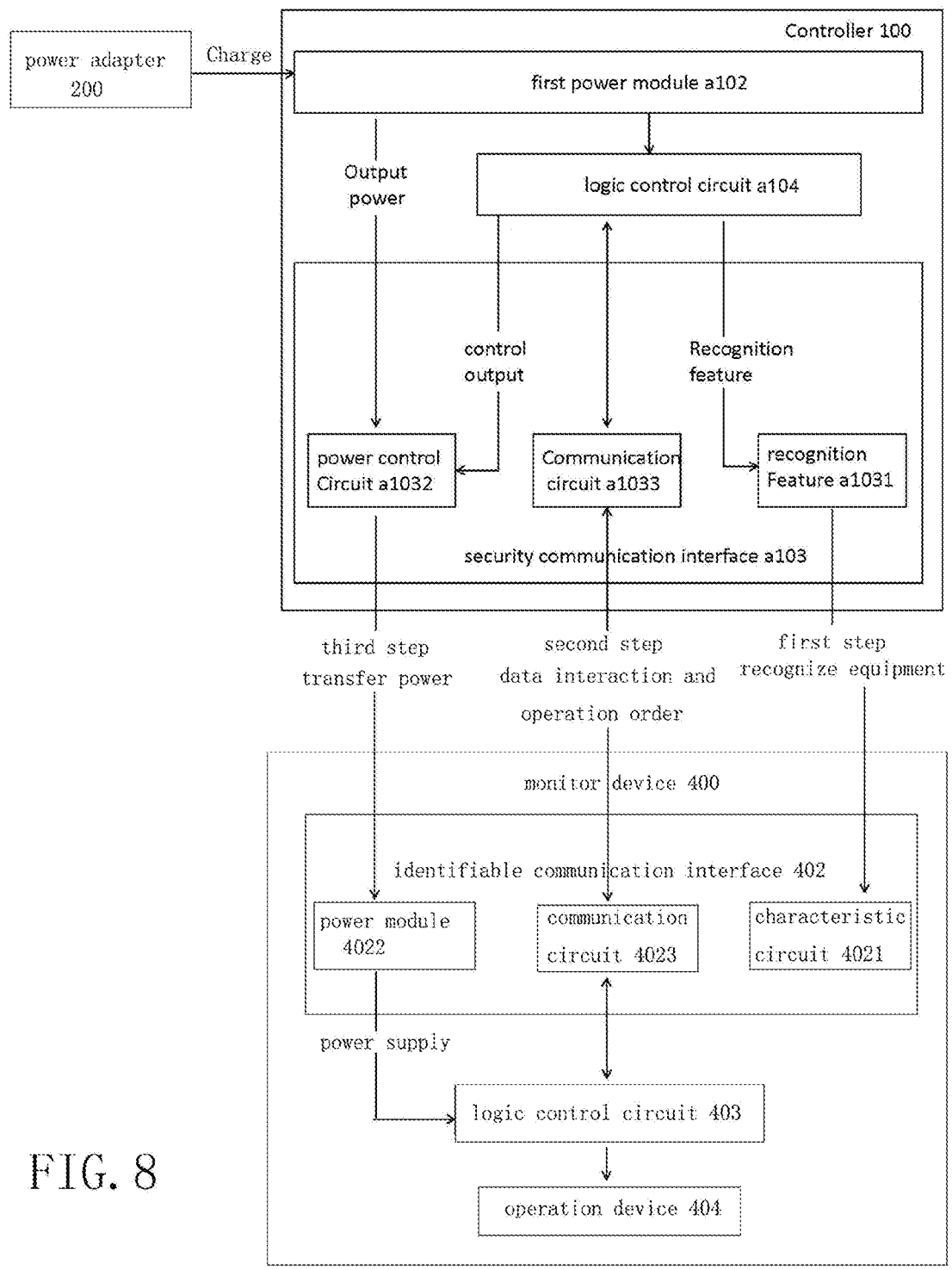
FIG. 8 is a schematic diagram of another controller according to the present invention.

FIG. 8 is a schematic diagram of a controller of the present invention. The controller of FIG. 8 can implement the power supply control. As shown in FIG. 8, the controller 100 comprises a first power module a102 for connecting and receiving power from the external power supply. The first power module a102 is configured to be capable of converting external power to the power supply by the controller. In some preferred embodiments, the first power module a102 can be connected to the power adapter 200. In some preferred embodiments, the controller 100 further comprises a security communication interface a103 for communicating with the monitor device 400, and is configured to communicate with the monitor device 400 via the security communication interface a103 and/or to power the monitor device 400 capable of establishing communication. In some preferred embodiments, the controller 100 further comprises a logic control circuit a104 that is configured to establish a power connection and communication for the first power module a102 and the security communication interface a103. In some preferred embodiments, the security communication interface a103 is a wired or wireless communication interface.

In some preferred embodiments, the security communication interface a103 comprises at least one identification circuit a1031 that is configured to connect the logic control circuit a104 and the monitor device 400, respectively, and to identify the monitor device 400. In some preferred embodiments, the monitor device 400 comprises at least one characteristic circuit 4021 that can be identified by the identification circuit. The identification circuit a1031 and the characteristic circuit 4021 perform feature matching to identify the same. If the feature is successfully matched, the identification is identified. Then, the monitor device 400 can be managed and powered by the controller 100.

In some preferred embodiments, the security communication interface a103 comprises at least one power control circuit a1032 that is configured to connect the logic control circuit a104 and the monitor device 400, respectively, and to provide power to the monitor device 400. In some preferred embodiments, the monitor device 400 comprises at least one second power module 4022 capable of receiving power and internally supplying power.

In some preferred embodiments, the security communication interface a103 comprises at least one communication circuit a1033 that is configured to respectively be connected to the logic control circuit a104 and the identifiable communication interface 402 of the monitor device 400 to establish a communication connection between the controller 100 and the monitor device 400. In some preferred embodiments, the communication interface 402 can comprise a communication circuit 4023 of one monitor device, the communication circuit can be connected to the communication circuit a1033 in the security communication interface a103 of the controller 100 for communication.

In some preferred embodiments, the monitor device 400 can also comprise a logic control circuit 403 and an operating device 404 of the monitor device. In some preferred embodiments, the operating device 404 can be a device that is used directly for alarming or antitheft, such as the alarm. In some preferred embodiments, the communication interface 402 of the monitor device is connected to the operating device 404 via the logic control circuit 403 of the monitor device, thereby powering, controlling, and managing the operating device 404, as previously described, controlling the alarm.

Main Controller and Auxiliary Controller

The present invention adopts a layering control method to manage the entire merchandise security system, or manages the merchandise security system in a certain area. The layering control may have different grades. In some preferred embodiments, the difference in the grade can be achieved by classifying the controllers. The main controller and the auxiliary controller are a classification of the controller. Among them, the main controller is a controller with a higher management grade, and can control and manage the monitor device in a larger range as described in the above paragraph. The auxiliary controller is a lower grade controller, and can be compared with the main control. The control and management as described in the above paragraph are performed on monitor device in a smaller range. In some preferred embodiments, the main controller is configured to have a control range not less than the auxiliary controller. Generally, the control range of the main controller is larger than that of the auxiliary controller. Alternatively, when there is only one controller, the main controller and the auxiliary controller are the same, and have the same control range at this time. In some preferred embodiments, the main controller is often controlled by a staff with a full store management level, such as the business supervisor or the store manager. At this time, the main controller can control all the controllers in the entire sales/display place, and have the widest control privilege. The auxiliary controllers can be assigned to various regions or different brands of the commodities or a certain type of the merchandise, such as a mobile phone/a notebook/a tablet. At this time, the control privilege of the auxiliary controller is limited to the commodities/exhibits placed in a certain area, or a certain brand of the commodities/exhibits, or a certain type of the merchandise. At this time, the control privilege of the auxiliary controller is smaller than that of the main controller. Since partition management in each sales place may be performed by different staff based on the brand, the region or the merchandise type, the controller in different grades of control needs to be adopted.

Figure 10:
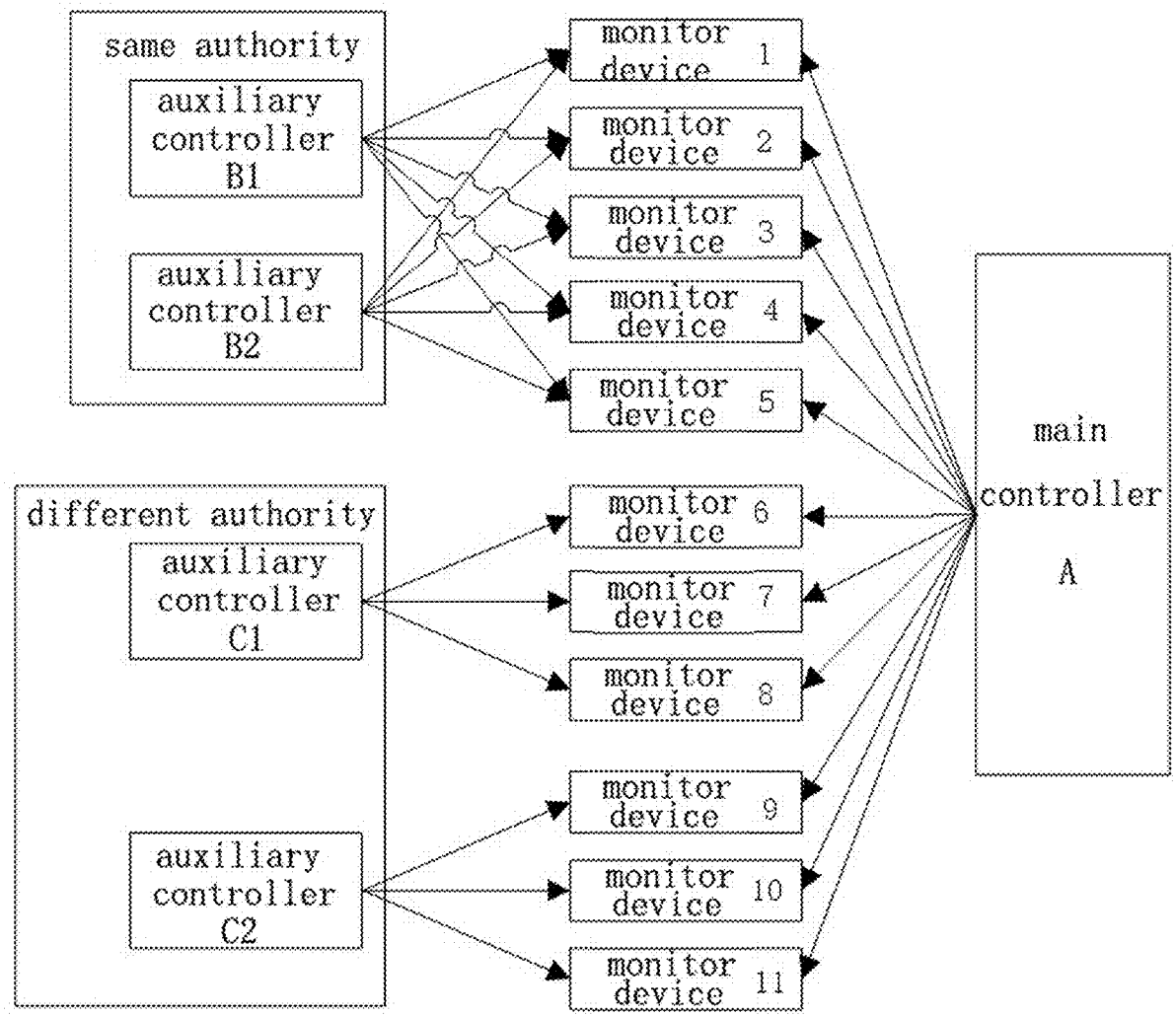
FIG. 10 is a diagram of a control manner of a controller according to the present invention.

For example, FIG. 10 shows a manner of layering management. As shown in FIG. 10, within a certain control range, there may be one main controller A, a plurality of the auxiliary controllers B1, B2, C1, C2, and a plurality of the monitor devices 1-11, wherein the main controller A can independently control all the monitor devices 1-11, and the auxiliary controllers can have the same control privilege or different control privileges, for example, the auxiliary controllers B1 and B2 have the same control privilege and both can control the monitor device 1-5 independently and respectively. This method may be applied when one area needs more than one administrator to manage, for example, an exhibition area of a certain brand is equipped with two clerks. The two clerks can hold the auxiliary controllers B1 and B2 respectively, and the store manager holds the main controller A, which realizes multi-level control. The auxiliary controllers C1 and C2 have different control privileges. The auxiliary controller C1 can control the monitor devices 6-8, independently and respectively, and the auxiliary controller C2 can control the monitor devices 9-11, independently and respectively, in which case the auxiliary controllers C1 and C2 may correspond to two independently managed regions. For example, if two brands are completely separately managed, the auxiliary controller with completely different privilege can be used, the store manager still holds the main controller A to realize multi-level control.

Figure 18:
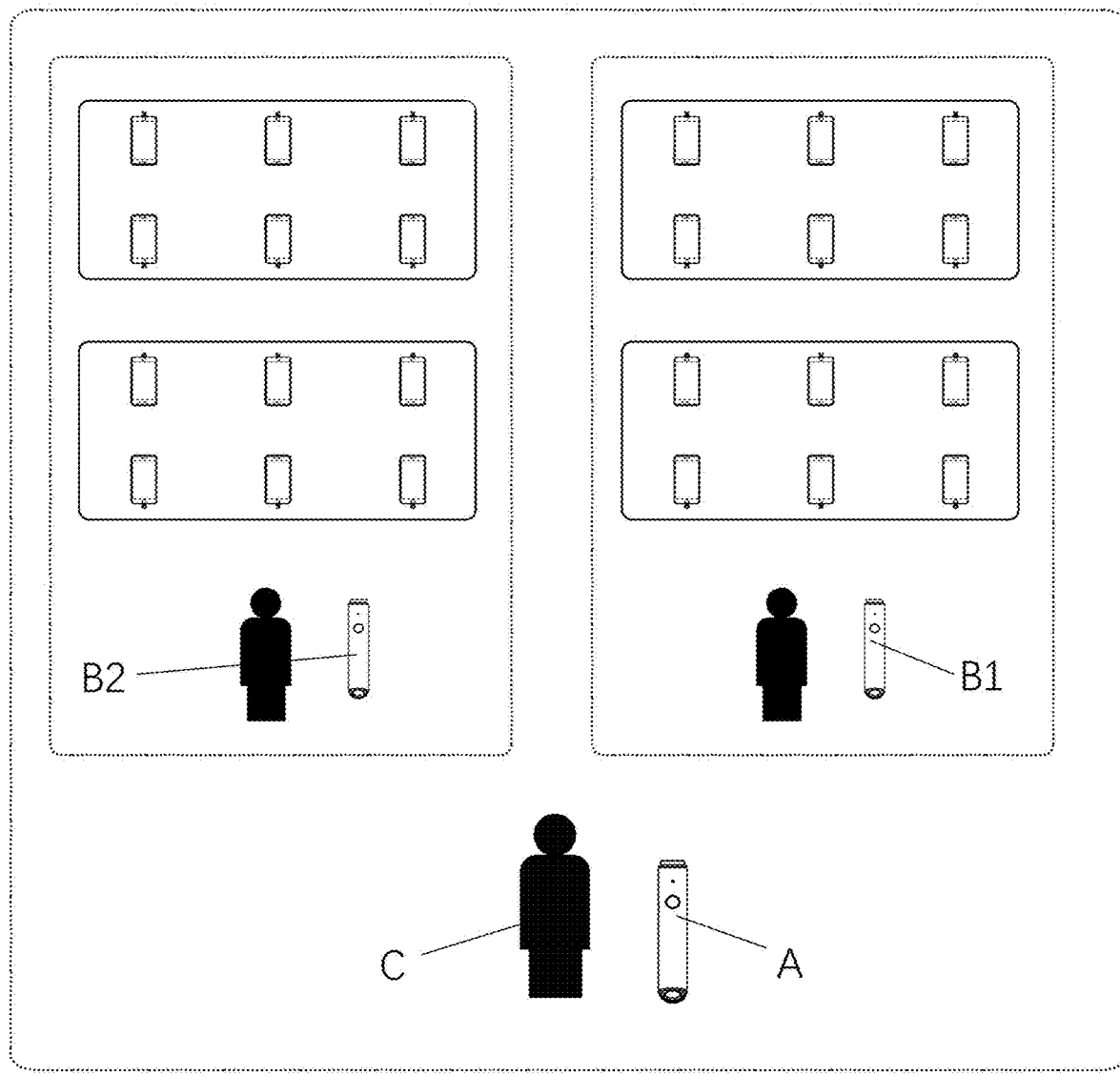
FIG. 18 is a diagram of a grading control according to the present invention.

For another example, FIG. 18 shows another layering management mode. One controller A can be set in the largest range and can control all the monitor devices in the range shown in FIG. 18. The user C of the controller A may be the administrator having the highest privilege in the range, such as the store manager, and correspondingly, within the range controlled by the controller A, one or more small-range controllers can be provided. For example, the scenario shown in FIG. 18 has two small ranges of controllers B1 and B2. The controllers B1 and B2 control a part of the area, respectively, which can be part of the range controlled by the controller A. The range controlled by the controllers B1 and B2 may be an overlapping part or a completely independent part, for example, the part shown in FIG. 18 is the completely independent part. That is, the controllers B1 and B2 each control one area. In this way, the controller B1 and B2 have independent control privileges over the respective regions thereof. In other ways, controllers B1 and B2 may have cross-controlled areas.

Figure 7:
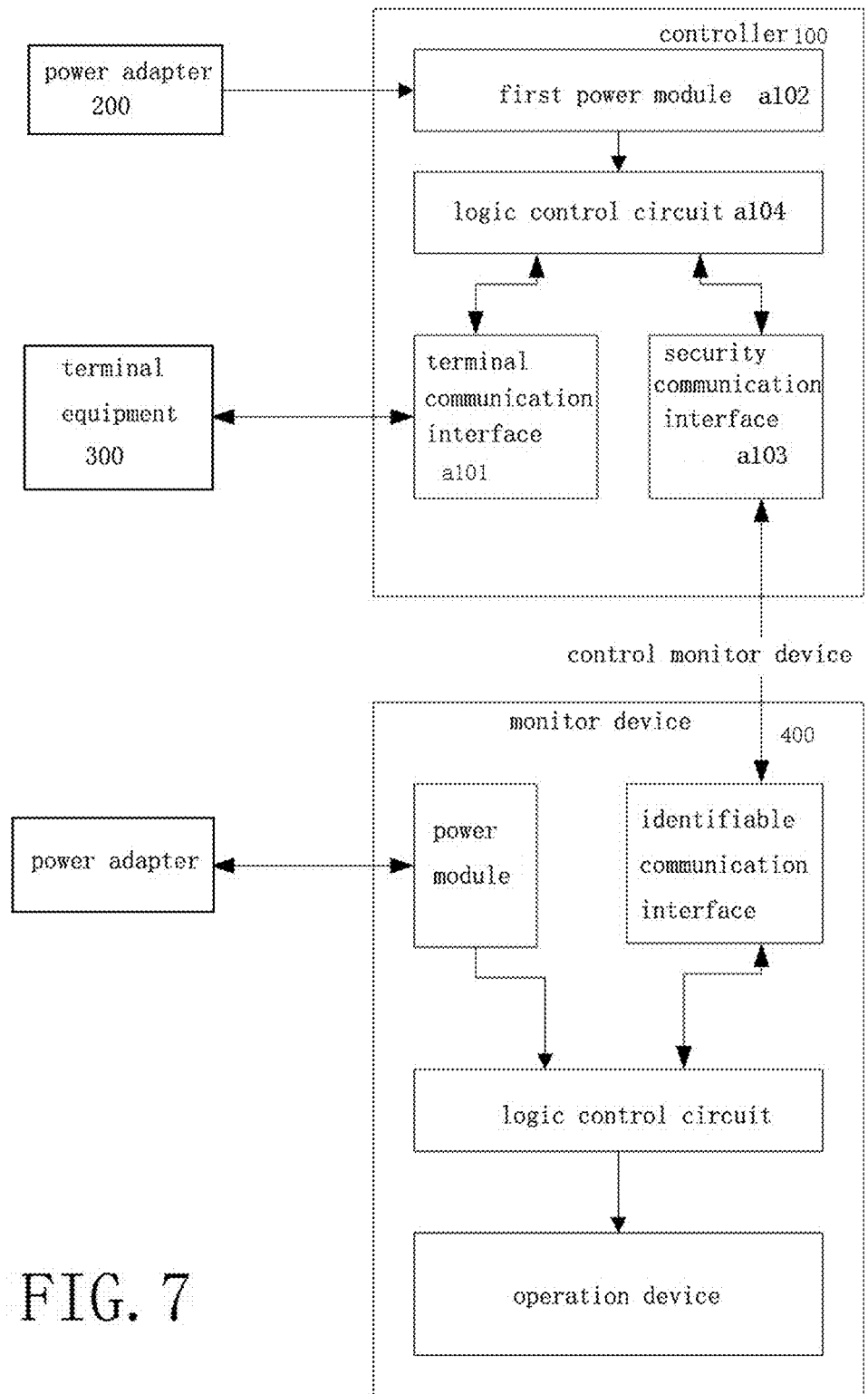
FIG. 7 is a schematic diagram of a controller according to the present invention.

FIG. 7 is a schematic diagram of a controller of the present invention. The controller of FIG. 7 can implement the grading control. As shown in FIG. 7, the controller 100 comprises the first power module a102 that is connected to and powered by the external power supply. The first power module a102 is configured to be capable of converting the external power supply to the power supply of the controller. In some preferred embodiments, the first power module a102 can be connected to the power adapter 200. In some preferred embodiments, the controller 100 further comprises the security communication interface a103 for communicating with the monitor device 400, and is configured to communicate with the monitor device 400 via the security communication interface a103 and/or to power the monitor device 400 capable of establishing communication. In some preferred embodiments, the controller 100 further comprises the logic control circuit a 104 configured to establish a power connection and communication for the first power module a102 and the security communication interface a103. In some preferred embodiments, the security communication interface a103 is the wired or wireless communication interface. In some preferred embodiments, the security communication interface a103 is an electrical contact point. In some preferred embodiments, the controller 100 shown in FIG. 7 can be connected to one or more monitor devices via the security communication interface a103. When the controller 100 in FIG. 7 controls the monitor devices 400 in different ranges, respectively, the main controller and/or the auxiliary controller are formed to implement grading control.

In some preferred embodiments, the controller shown in FIG. 7 has a terminal communication interface a101 capable of communicating with the terminal device 300, and is configured to be capable of communicating with the terminal device 300 via the terminal communication interface a101, and performing setting via the terminal device 300. The setting may comprise settings of access, on, off, and control range. In some preferred embodiments, the terminal communication interface a101 can be the wireless communication interface, which can comprise both Bluetooth and WIFI modes.

In some preferred embodiments, if the terminal communication interface a101 is a Bluetooth interface, in the Bluetooth mode, the controller 100 is a slave device, and the terminal device 300 is a master device. Therefore, one terminal device 300 can be connected to a plurality of the controllers 100. In some preferred embodiments, the controller 100 can comprise the main controller and the auxiliary controller. As shown in FIG. 12, in some preferred embodiments, the connected controller 100 can be displayed on the interaction interface of the terminal device 300 for easy control. If the terminal communication interface a101 is a WIFI interface, in the WIFI mode, one terminal device 300 can be connected to a plurality of the controllers 100 via a wireless network. In some preferred embodiments, the controller 100 can comprise the main controller and the auxiliary controller. In some preferred embodiments, the main controller is directly connected to the terminal device 300, and the auxiliary controller is connected to the terminal device and set via the main controller. In some preferred embodiments, the main control is first set by the terminal device 300. Then, the auxiliary controller is set by the terminal device 300 within the setting range of the main controller.

Monitor Device

The monitor device, as its name suggests, is a device that is set up for security. In the present invention, the monitor device 400 mainly refers to some devices used in the field of the merchandise security, which can play a certain role in merchandise security, or can play a certain role in a certain part of merchandise security, for example, the alarm. When the merchandise is in the unsafe state or is considered to be in the unsafe state, the alarm may issue an alarm sound or an audible prompt and a visual prompt and other alarming signals. For example, the sensor may be used to sense whether the merchandise is in the safe state. As another example, the locking device of the merchandise can directly act on the merchandise and limit the merchandise to be a state considered to be safe. In short, the monitor device is in the security system, which controls and manages the merchandise that need the antitheft, so that the merchandise requiring the antitheft is in the safe state or the state considered to be safe. The controller can lock or unlock the monitor device (for example, an item lock), or manages the operable or inoperable state of the monitor device, which is the control of the monitor device itself.

Figure 9:
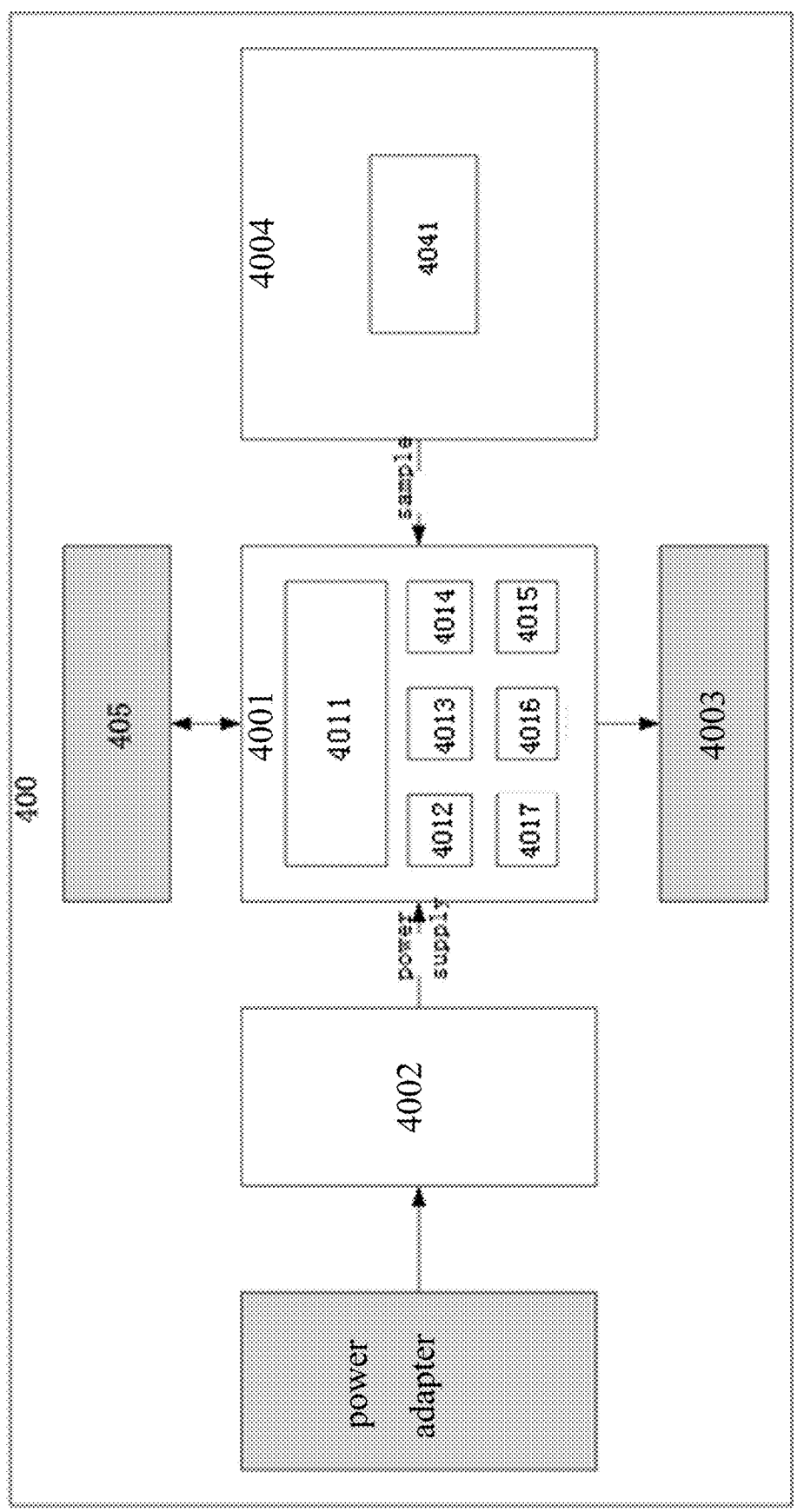
FIG. 9 is a schematic diagram of a monitor device according to the present invention.

FIG. 9 provides a diagram of an internal structure of a typical monitor device. In some preferred embodiments, the monitor device 400 can comprise a base, on which the sensor and/or the merchandise can be placed. When the sensor and/or the merchandise exits the pedestal, it is possible that the merchandise is being experienced state (taken by the experiencer). The sensor is configured to be directly and indirectly connected and/or attached to the merchandise, and operatively placed and/or mounted on the monitor device. For example, the sensor is picked up and lowered from the monitor device. In some preferred embodiments, if the connection between the sensor and the item is not disconnected, but the sensor and/or the merchandise leaves the base of the monitor device 400 at the same time, it can be determined that the merchandise is in an experienced state.

FIGS. 14-15 show two typical implementation manners of the monitor device. In some preferred embodiments, the monitor device 400 comprises the charging interface that can also power the merchandise loaded by the charging interface when the monitor device 400 is capable of being charged by the controller 100, such as the situation shown in FIG. 14. The monitor device 400 comprises a lightning connector or a mobile phone Type C connector that powers the phone. In some preferred embodiments, the monitor device 400 can be a padlock. In this case, the merchandise 500 loaded by the monitor device 400 may be an accessory with a hanging interface, such as a mobile phone case, a cell phone film, or the like. In some preferred embodiments, as shown in FIG. 15, the monitor device 400 has the electrical contact hole 407 that cooperates with the electrical connector 105 of the controller. Through the electrical contact hole 407, the monitor device 400 can be controlled, managed, and powered by the controller 100. In some preferred embodiments, the electrical contact hole 407 and the electrical connector 105 are electrically connected by the cooperation of the electrical contact points.

FIG. 9 is a structural diagram of the monitor device according to the present invention. As shown, the monitor device 400 comprises the monitoring circuit 4001, which can be used to receive sampling values and perform calculation on the sampling values to determine that the monitored object is in the normal state, the abnormal state, the stable state, or the unstable state.

In some preferred embodiments, the monitoring circuit 4001 can comprise a central processor 4011 that can be used to process a sampling signal input to the monitor device 400. In some preferred embodiments, the monitoring circuit 4001 can comprise a storage device 4012 that can be used to store the preset value of the monitor device. In some preferred embodiments, the monitoring circuit 4001 can also comprise a control circuit 4015 that can be connected to the central processor 4011 and that receives the signal from the central processor 4011 for internal control. In some preferred embodiments, the monitoring circuit 4001 can also comprise one communication interface 4017, which can be used to internal communication of the monitor device 400 in some cases. In some preferred embodiments, the monitoring circuit 4001 can also comprise a filter circuit 4013, a signal amplifier 4014 and a detection circuit 4016. The detection circuit 4016 can be used to detect the stability and integrity of the sampled data.

In some preferred embodiments, the monitor device 400 can comprise the power module 4003 for powering the monitoring circuit 4001 and the central processor 4011. In some preferred embodiments, the power module 4003 can also power other functional modules within the monitor device 400. In some preferred embodiments, the power module 4003 can be powered by the controller 100 to power an internal module of the monitor device 400. In some preferred embodiments, the power module 4003 can be externally arranged to the monitor device 400.

In some preferred embodiments, the monitor device 400 can comprise the induction circuit 4004 that can be used to be directly and indirectly connected and/or attach to the merchandise, to sense information and to perform sampling by an induction manner. Alternatively, the induction circuit 4004 can sample the environment. In some preferred embodiments, the induction circuit 4004 performs sampling via an induction element 4041. The induction element 4041 can be various sensors, such as a temperature sensor, a voltage sensor, a current sensor, a humidity sensor, a vibration sensor, a pressure sensor, a magnetic field sensor, an infrared sensor, a light sensor, etc.

In some preferred embodiments, monitor device 400 can comprise the identifiable communication interface 405. In some preferred embodiments, the monitor device can be configured/preset via the identifiable communication interface 405. In some preferred embodiments, monitor device 400 can be controlled by the controller 100 via the identifiable communication interface 405.

In some preferred embodiments, the monitor device 400 can be connected to an alarm circuit 4002. In some preferred embodiments, the monitor device 400 can directly alarm via the alarm circuit 4002. In some preferred embodiments, the monitor device 400 can transmits an alert signal outward via the alarm circuit 4002.

Figure 19:
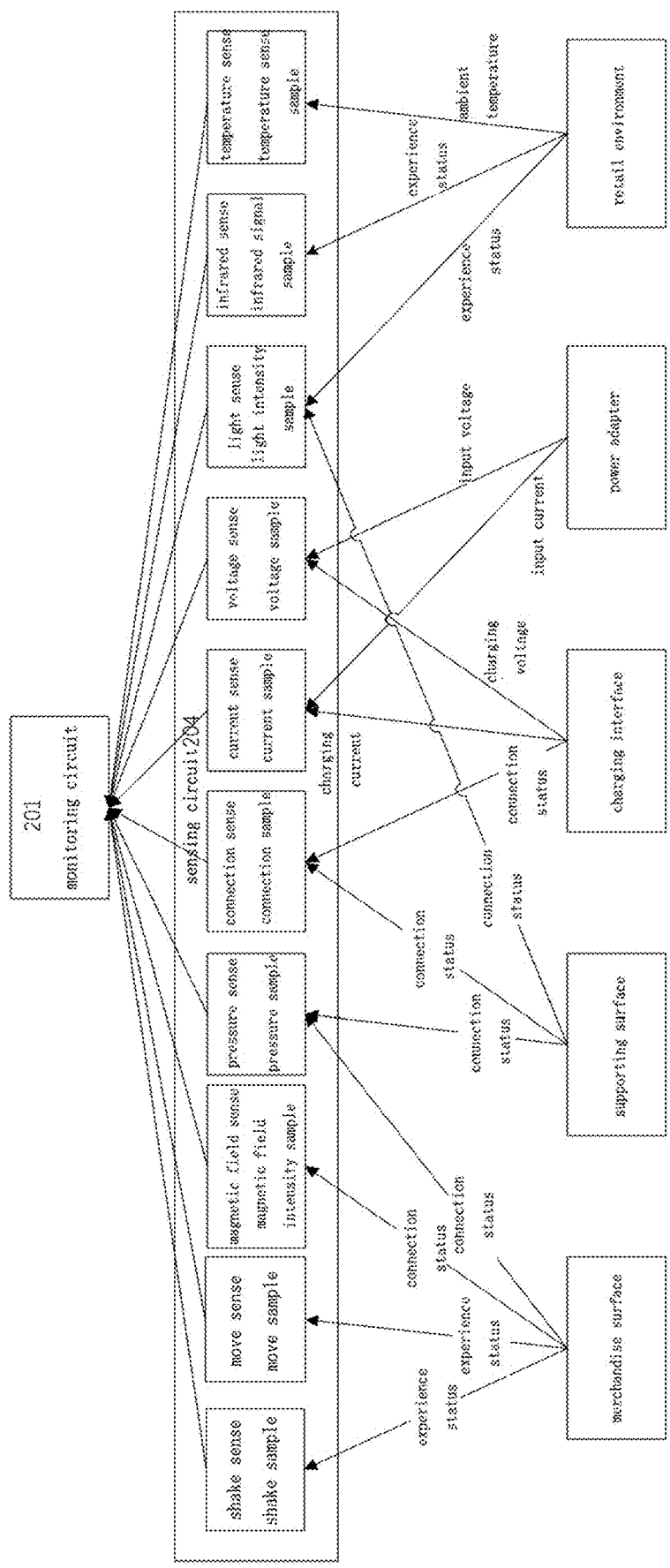
FIG. 19 is a diagram of monitoring and sensing according to the present invention.

FIG. 19 is a diagram of monitoring and induction of the monitor device according to the present invention. As shown, the induction circuit may comprise various induction sampling elements/circuits, for example, a vibration induction element for vibration sampling, and a movement induction element for sampling movement, a magnetic field induction element for sampling magnetic field strength, a pressure induction element for sampling a pressure value, a connection induction element for sampling a connection state, a current induction element for sampling a current value, and a voltage induction element for sampling a voltage value, a light induction element for sampling light intensity, an infrared induction element for sampling an infrared signal, and a temperature induction element for sampling an ambient temperature or a temperature of an attached article.

In some preferred embodiments, the vibration induction element, the movement induction element or the magnetic field induction element or the pressure induction element can be used to sample the surface of the merchandise. In some preferred embodiments, the pressure induction element, the connection induction element or the light induction element can be used to sample a support surface. In some preferred embodiments, the connection induction element, the current induction element or the voltage induction element can be used to sample the charging interface. In some preferred embodiments, the current induction element or the voltage induction element can be used to sample the power adapter. In some preferred embodiments, the light induction element, the infrared induction element or the temperature induction element can be used to sample a retail environment or an environment in which the merchandise is located.

In some preferred embodiments, the magnetic field induction element, the pressure induction element, the connection induction element or the light induction element can sense and sample a connection state. In some preferred embodiments, the vibration induction element, the movement induction element, the light induction element or the infrared induction element can sense and sample the experienced state of the merchandise, such as whether the merchandise is in an experienced state, the number of times that the merchandise is experienced, and the length of time experienced. In some preferred embodiments, the current induction element can sense and sample the charging current of the charging interface and the input current of the power adapter. In some preferred embodiments, the voltage induction element can sense and sample the charging voltage of the charging interface and the input voltage of the power adapter. In some preferred embodiments, the temperature induction element can sense and sample the temperature of the environment.

Figure 20:
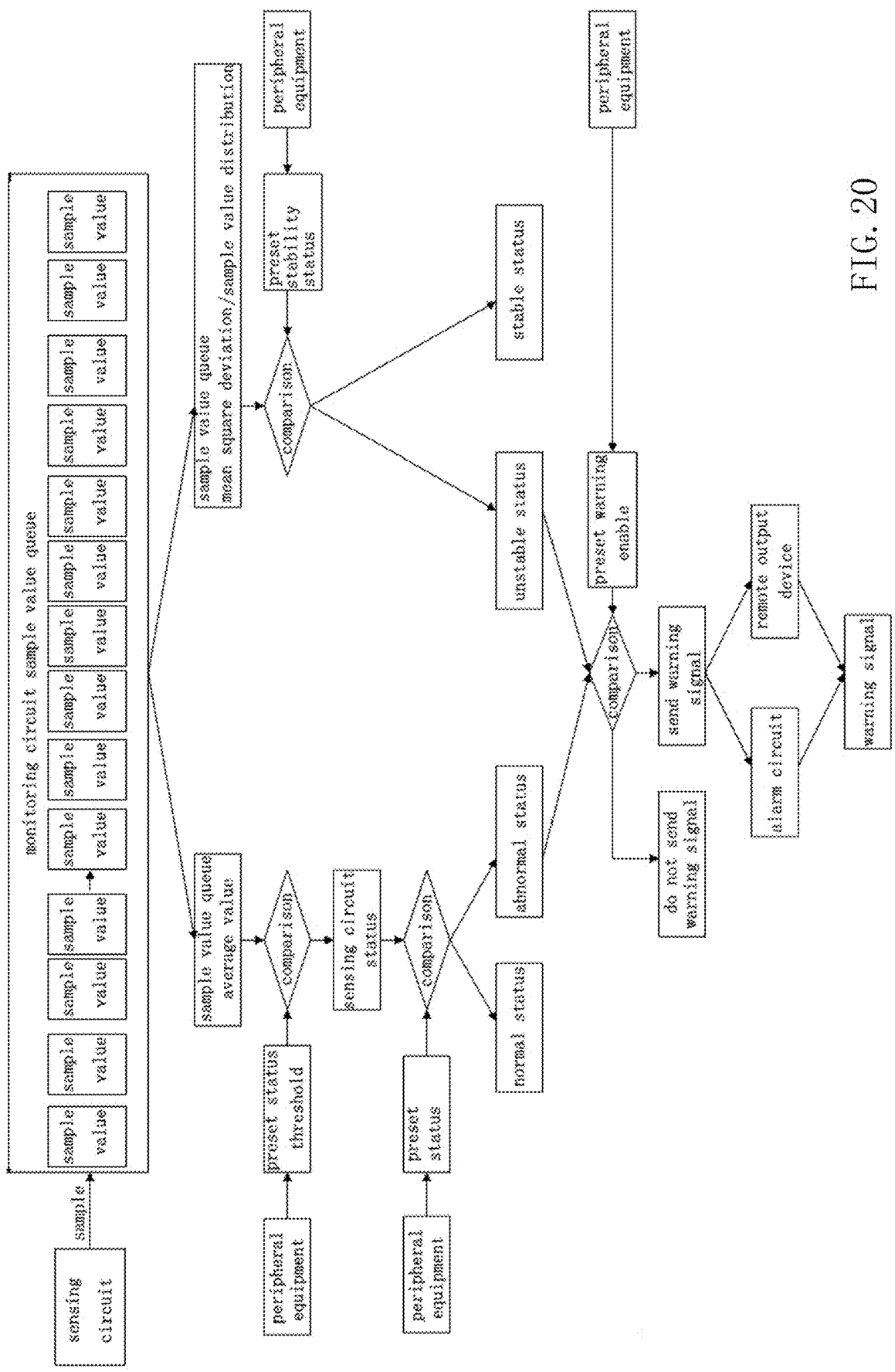
FIG. 20 is a flow chart of the processing of a monitor device according to the present invention.

FIG. 20 is a flowchart of processing of a monitor device according to the present invention, as shown in the figure.

The calculation and determination processes of the sampled value by the monitor device 400 are as follows:

First, the sampled value of the induction circuit is acquired in real time, and the sample value queues X1, X2, X3, Xn (n>=32) are formed in unit of the minimum sample number 32.

A. The determination of the normal state and the abnormal state:

For the sampled value queues X1, X2, X3, Xn, the operation that the arithmetic average value is calculated according to formula (1).

$$\bar{x} = \frac{x_1 + x_2 + \ldots + x_n}{n} = \frac{\sum_{i=1}^{n} x_1}{n} \quad \text{formula (1)}$$

The average value of the sampling queue is obtained.

Figure 21:
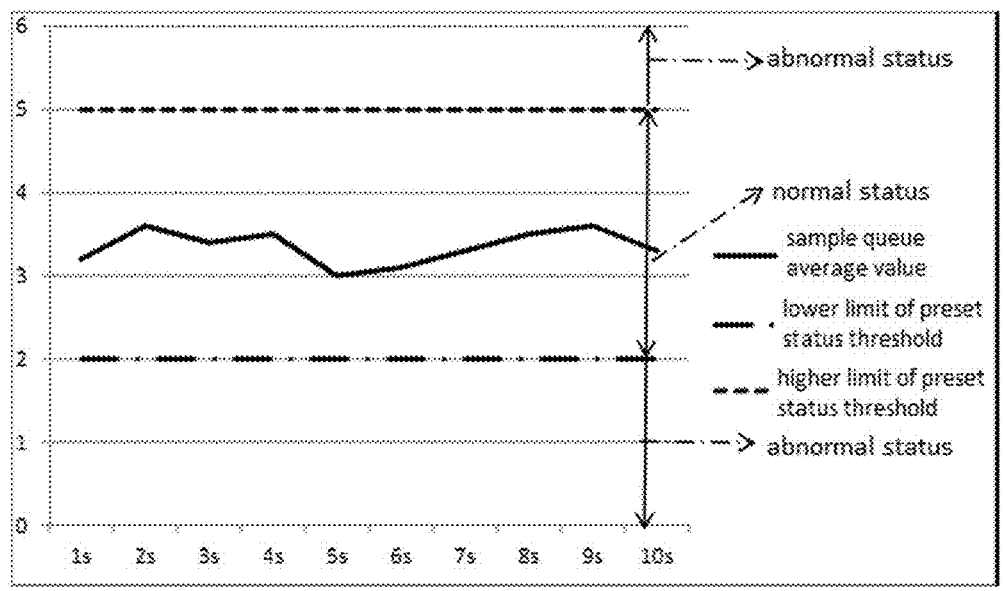
FIG. 21 is a diagram of the determination of a normal state and an abnormal state by a monitoring circuit.

As shown in FIG. 21, the monitor device may be preset by a peripheral device by initializing the peripheral device, that is, a normal state. Upper and lower thresholds of a threshold value of a preset state is set. an average value of the sampling queue is obtained by performing an arithmetic average operation on the sampling queue and is compared with the preset state threshold:

>Preset state threshold upper limit—the abnormal state occurs, and the monitor device runs to the abnormal state;

<Preset state threshold lower limit—the abnormal state occurs, and the monitor device runs to the abnormal state;

The lower limit of the preset state threshold<the average value of the sampling queue<the upper limit of the preset state threshold—is normal, and the monitor device runs to the normal state.

B. The determination of the stable state and the unstable state:

For the sampled value queues X1, X2, X3, Xn, the operation that the arithmetic average value is calculated according to formulas (2)-(4). There are variance σ2 and standard deviation σ, $$\overline{x} = \frac{x_1 + x_2 + \ldots + x_n}{n} = \frac{\sum_{i=1}^{n} x_1}{n}, \quad \text{formula (2)}$$

$$\sigma^2 = \frac{\sum_{i=1}^{N} (x_i - \mu)^2}{N}, \quad \text{formula (3)}$$

$$\sigma = \sqrt{\sigma^2} = \sqrt{\frac{\sum_{i=1}^{N} (x_i - \mu)^k}{N}}, \quad \text{formula (4)}$$

Figure 22:
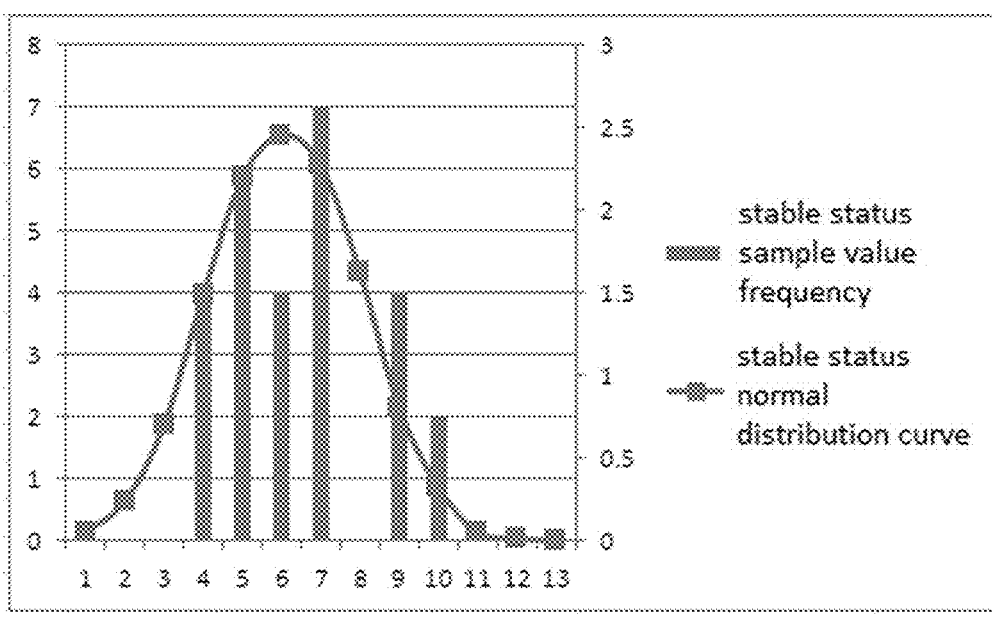
FIG. 22 is the frequency of sampled values and a normal distribution curve of a stable state.
Figure 23:
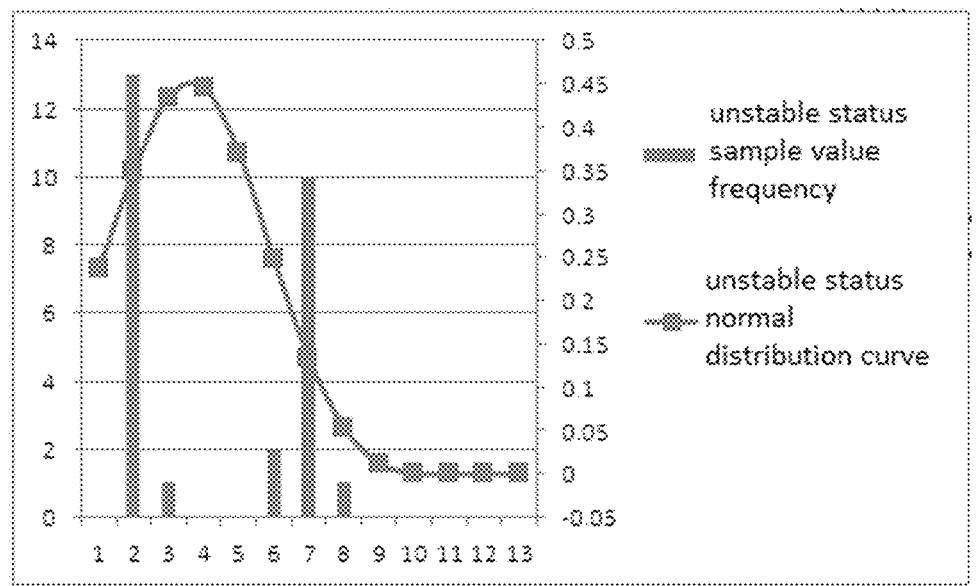
FIG. 23 is the frequency of sampled values and a normal distribution curve of an unstable state.
Figure 24:
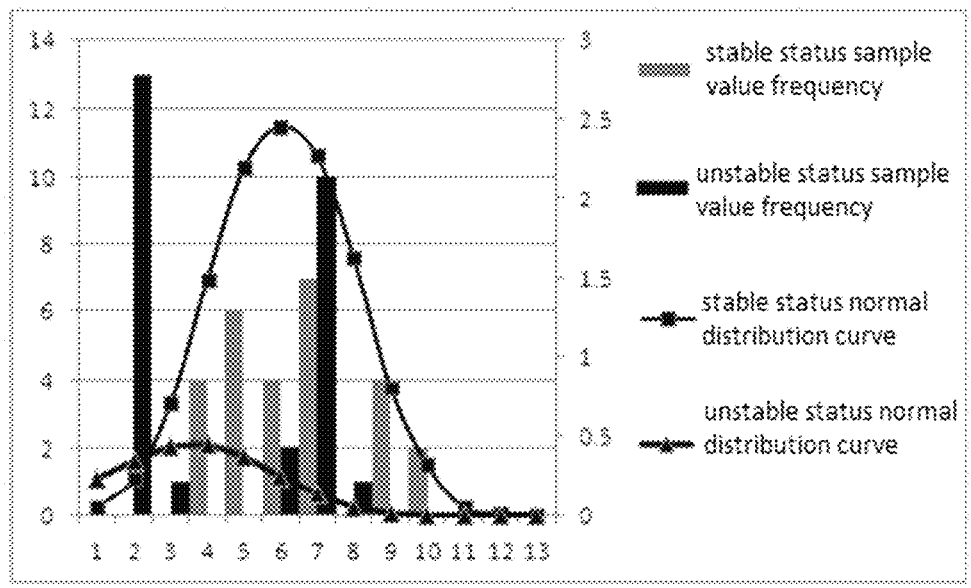
FIG. 24 is a comparison of the frequencies of sampled values and the normal distribution curves of a stable state and an unstable state.

The obtained arithmetic average value of the sampling queue is wrong! The reference source was not found. There are variance σ2 and standard deviation σ. A normal distribution curve as shown in FIG. 22-24 is drawn.

The monitor device may be provided with the stable state threshold by initialization of the peripheral device. The stable state threshold comprises an arithmetic average value threshold μ, a normal distribution deviation degree threshold interval [μ−5δ, μ+5δ]. Through the data analysis and processing of the sampling queue, the arithmetic mean μ1 is obtained. The normal distribution probability density maximum interval [A1, A2] is compared with the stable state threshold:

[A1, A2]⊆[μ−5δ, μ+5δ] and |μ−μ1|≤3δ, the sampled induction circuit is in the stable state.

When A2<μ−5δ or |μ−μ1|>3δ, the sampled induction circuit is in the unstable state.

When A1>μ+5δ or |μ−μ1|>3δ, the sampled induction circuit is in the unstable state.

SPECIFIC EMBODIMENTS

Figure 1:
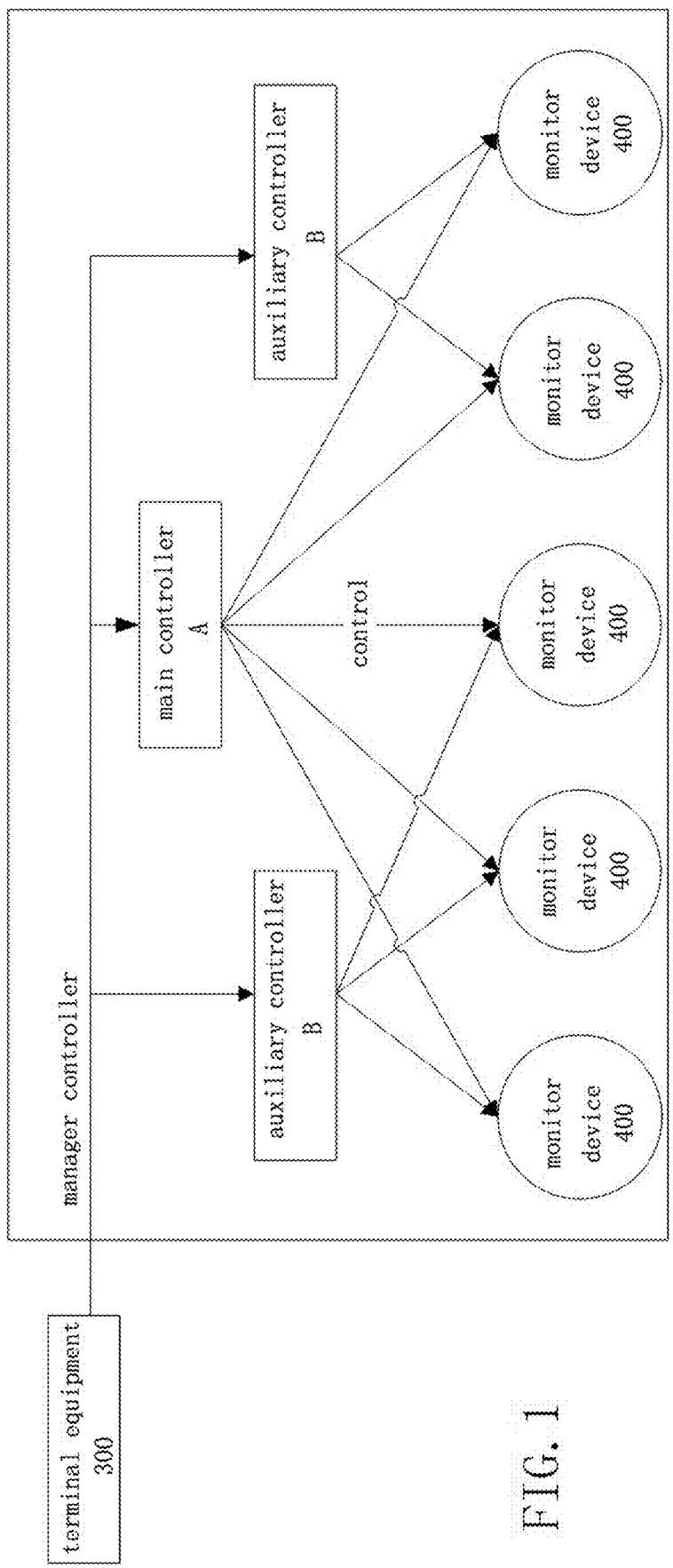
FIG. 1 is a schematic diagram of a grading control system according to the present invention.

FIG. 1 shows a schematic diagram of a typical implementation manner according to the present invention. The figure shows the relationship between the various modules and devices. In general, the set of security systems may comprise at least one main controller A and at least one auxiliary controller B. As a typical embodiment, the present manner comprises two auxiliary controllers B, each of which can independently control a plurality of monitor devices 400. The monitor device 400 is actually in direct or indirect operative connection/attachment/load/support relationship with a merchandise. The merchandise is usually attached/mounted/connected with a sensor. As shown in the figure, a typical embodiment of the present invention is that the monitor devices 400 controlled by different auxiliary controllers B are partially identical or partially different. That is, the control ranges of the different auxiliary controllers B can be identical, different, or overlapping. The main controller A can control all of the monitor devices 400 in the area thereof. As a typical embodiment, a terminal device 300 may be further comprised in the manner. The terminal device 300 is connected to each of the main controller A and the auxiliary controller B, respectively, and can set on/off/range of all controllers via one device/one operation interface. In some preferred embodiments, the terminal device 300 can operate the monitor device 400, such as unlocking, setting an alarm range, etc., while maintaining the connection relationship with the controller.

In the present invention, the monitor device and a controller can communicate in an existing manner, or can communicate via a specific system identification code. Obviously, the specific system identification code can make the communication in the control system more secure and reliable.

The system identification code is one communication code set for communication of devices in the security system. In some preferred embodiments, the system identification code can be placed into a security device and/or the controller. In some preferred embodiments, the system identification code can be used directly for communication within the security system. As shown in FIG. 31, in some preferred embodiments, the system identification code (SID) may comprise a channel number and an address number. The channel number refers to a channel for communication between devices in the security system. In wireless communication, an appropriate channel is selected for communication, which can avoid a possible interference factor. In some preferred embodiments, the controller selects a channel with less interference for communication when initializing a security device, and records the channel number as part of the system identification code for subsequent communication. In some preferred embodiments, the same security system uses a unique channel number. If a plurality of the security systems exists in the same wireless network, the controllers in different security systems choose a wireless communication channel different from other security systems when initializing the security device, to avoid mutual interference of wireless communication within the same network, and also ensure communication security within each security system to be safe. For example, if three security systems share the same wireless network for communication, three different channel numbers can be selected respectively.

In some preferred embodiments, the address number may comprise a communication code, a device code, and a privilege code. In some preferred embodiments, the channel number is a communication code used for communication between devices in the security system. The devices in the same security system can identify a communication address of the controller in the security system via communication coding, and can further ensure that the devices in the security system do not establish antitheft communication with the controller other than the security system and are controlled by the controller other than the security system. Since the communication of the antitheft device needs to be limited to a certain system, the devices in the same system can allow all or part of the communication, but in different security systems, cross control is usually not allowed. For the communication system, the unique communication address is set and used to identify the devices in the system via the communication address, which can effectively ensure the security in the security system.

In some preferred embodiments, the communication code is lower 2 Bytes of a serial number built into the controller.

In some preferred embodiments, the device code is the lower 2 Bytes of a device serial number. In some preferred embodiments, the privilege code is a system preset value. In some preferred embodiments, the privilege comprises a regional privilege, a merchandise category privilege, a control personnel privilege, and the like. In some preferred embodiments, the above privileges are set for different security devices and/or controllers by different privilege codes. In some preferred embodiments, the address number can comprise a plurality of levels of the address numbers. In some preferred embodiments, the address number grading can be ranked according to the degrees of discrimination between the systems, the devices, and regions. In a preferred embodiment, the system address number may comprise three grades of address numbers: a system broadcast address number, a privilege broadcast address number, and an M2M address number. In some preferred embodiments, the M2M address number can be used for point-to-point communication. In some preferred embodiments, the privilege broadcast address number can be used to communicate with a security device in a certain area. In some preferred embodiments, the privilege broadcast address number can be used to communicate with the security device associated with a certain class/brand of merchandise. In some preferred embodiments, the privilege broadcast address number can be used to communicate with the security device that belongs to a certain administrative privilege. In some preferred embodiments, the system broadcast address number can be used to communicate with all security devices in the entire security system.

Figure 26:
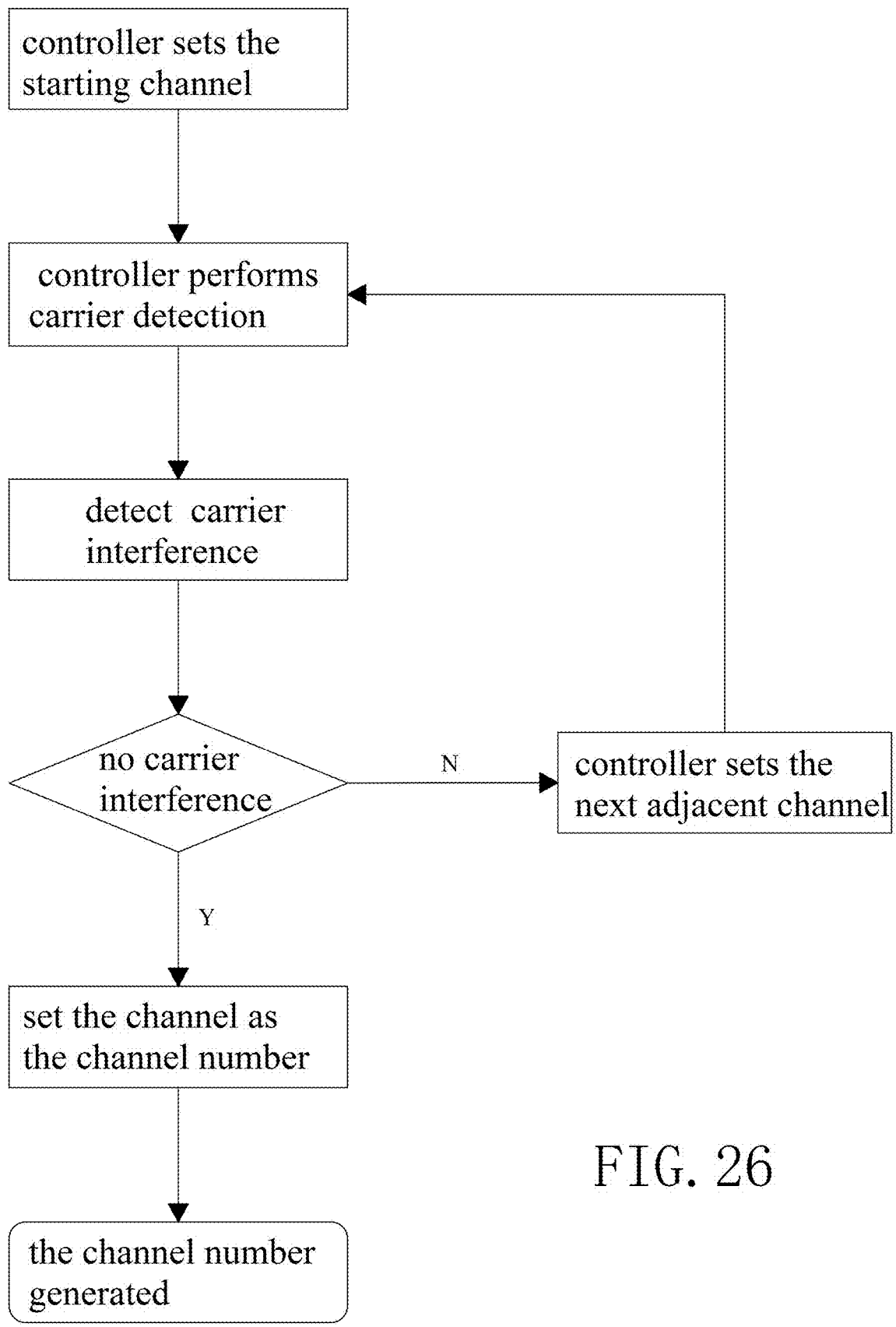
FIG. 26 is a flow chart of the generation of channel number according to the present invention.
Figure 27:
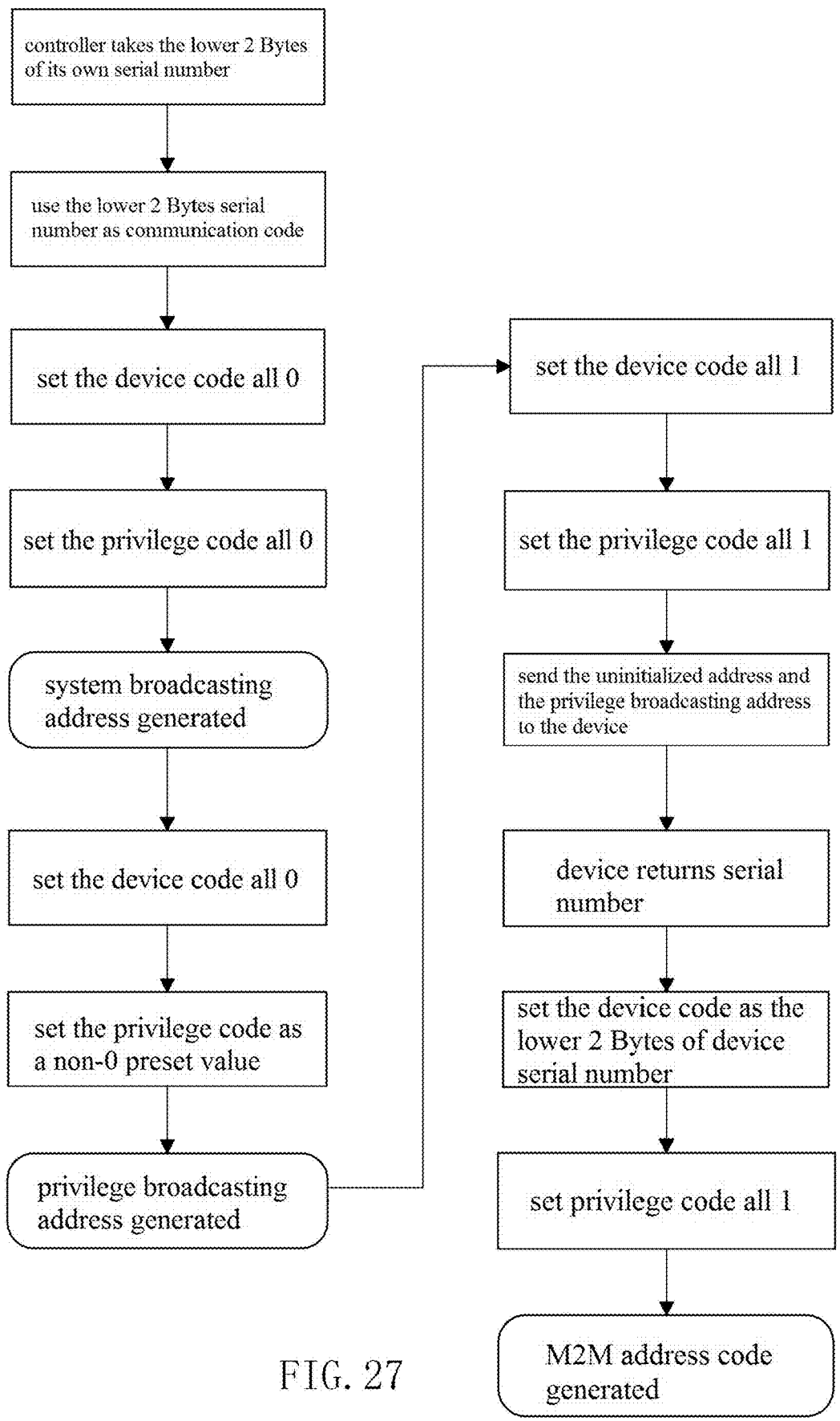
FIG. 27 is a flow chart of the generation of an address number in a controller.

In some preferred embodiments, as shown in FIG. 26, the channel number is generated by the controller, and the default channel number when the controller leaves a factory is the default broadcast channel number. When the system channel number needs to be generated, the controller first sets the starting channel number and writes the starting channel number into a wireless module in the controller, after which the controller performs carrier detection to detect the presence or absence of carrier interference in the current channel. If there is no carrier interference, the channel number is used as the channel number of the system; if there is carrier interference, the carrier is detected by transforming to the next adjacent channel. The channel number thereof is used as the channel number of the system until the carrier with no carrier interference or less interference is detected, In some preferred embodiments, the address number of the controller is generated as shown in FIG. 27, and the controller has default initial address numbers, which are all zeros. The default initial address number is used in the default broadcast for communication between an uninitialized controller and an uninitialized device.

In some preferred embodiments, when generating the address number, the controller takes the lower 2 Bytes of the own serial number thereof as the communication code of the system, and sets both the device code and the privilege code to be 0, that is, the system broadcast address number. The system broadcast address number can broadcast data to the device throughout the system.

In some preferred embodiments, when generating the address number, the controller takes the lower 2 Bytes of the own serial number thereof as the communication code of the system, and sets the device code to be 0, and sets the privilege code to the preset privilege value, that is, the privilege broadcast address number. The privilege broadcast address number has certain privilege, and can broadcast data to the device within a certain range.

In some preferred embodiments, when generating the address number, the controller takes the lower 2 Bytes of the own serial number thereof as the communication code of the system, and sets both the device code and the privilege code to all 1, that is, the M2M address number that is not initialized. The M2M address number that has not been initialized cannot be used normally. A user needs to obtain device-related information and complete the M2M address number before the user can use the M2M address number normally. The controller needs to transmit the uninitialized M2M address number together with the privilege broadcast address number to the device through the default broadcast channel. The device returns the device's own serial number. According to the serial number of the device, the controller takes the lower 2 bytes of the serial number as the device code, and the communication code and the privilege code remain unchanged, that is, the M2M address number. In some preferred embodiments, as previously discussed, the M2M address number can be used for controller-to-device communication.

In some preferred embodiments, the process of generating the security device identification code comprises: when the security device is not initialized, the address number is a default initial address number (that is, the address number of all 0s), and is in a default broadcast channel, and receives information from the controller. When the security device receives the uninitialized M2M address number sent by the controller, the privilege broadcast address number, the channel number and other information, the device first perfects the uninitialized M2M address number and fills the device code by using the lower 2 bytes of the own serial number thereof. At this point, the M2M address number has been generated, and the privilege broadcast address number is also sent by the controller, leaving only the system broadcast address number not set. The system broadcast address number can be obtained by changing the privilege code to be 0 by the privilege broadcast address number. So the privilege code of the privilege broadcast address number is cleared to obtain the system broadcast address number. After obtaining three address numbers, the device needs to set corresponding three wireless receiving channels. The M2M address number is used to set the channel 0 address to obtain the M2M channel. The privilege broadcast address number is used to set the channel 1 address to obtain the privilege broadcast channel. The system broadcast address number is used to set the channel 2 address to obtain the system broadcast channel. The security device uses these three channels to receive controller information or send data information to the controller. Generally, a system broadcast channel and a privilege broadcast channel are used to receive broadcast information of the controller. The M2M channel is used to receive an instruction from the controller or transmit data to the controller. Then, the own serial number thereof is replied to the controller so that the controller perfects the uninitialized M2M address number. Finally, a switching channel is the channel pointed to by the channel number established by the controller.

In some preferred embodiments, the system identification code is formed together when the channel number, the communication code of the controller, the device code of the security device, and the privilege code are generated.

Figure 25:
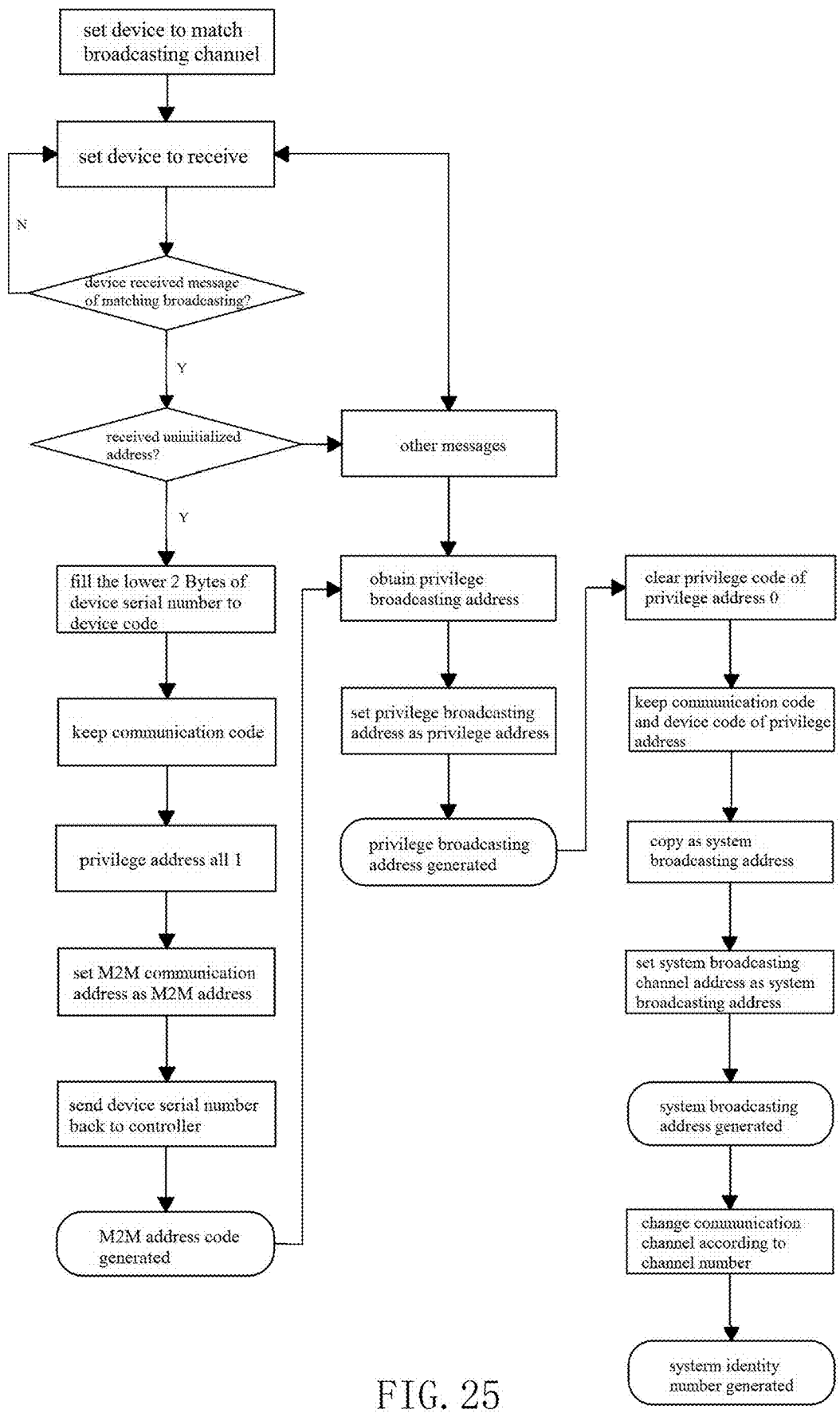
FIG. 25 is a flow chart of the generation of a system identification code according to the present invention.

In some preferred embodiments, the entire generation process of the system identification code is as shown in FIG. 25, and comprises the following processes: setting the security device in the security system to be in a paired broadcast channel; adjusting the security device in the security system to be in a receiving state; transmitting by the controller the paired broadcast information to determine whether the device can receive the paired broadcast information; if so, continue, and if no, return to the previous step; determining by the security device whether the uninitialized address number can be received; if so, proceeds to the next step, and if not, feed back other information and re-adjust the receiving state of the security device; filling the device code of the lower 2 bytes of the device serial number of the security device that receives the uninitialized address number into the device code; recording a communication code of the controller; setting the privilege codes to be all 1; setting a M2M communication address to the M2M address number; transmitting the device serial number of the security device back to the controller; generating the M2M address number of the security device; obtaining the privilege broadcast address; setting the address of the privilege broadcast channel to the privilege broadcast address number; generating privilege broadcast address number; clearing a privilege code in the broadcast address; retaining the communication code and the device code in the broadcast address number; copying the code to be the system broadcast address; setting the system broadcast address to be the system broadcast address number; generating the system broadcast address number; converting the communication channel according to the channel number; and generating the system identification code according to the channel number, the M2M address number, the broadcast privilege address number, and the system privilege address number.

Figure 28:
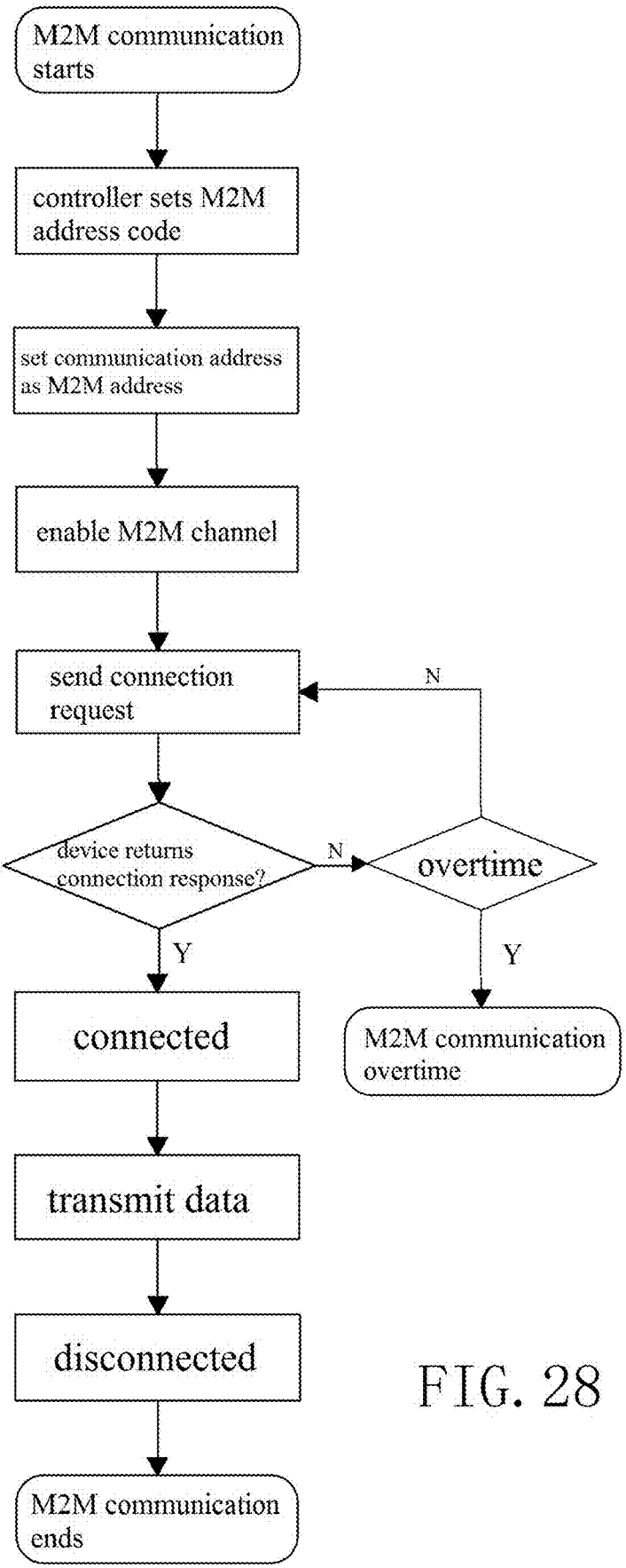
FIG. 28 is a diagram of a M2M communication manner between a controller and a security device.

In some preferred embodiments, the M2M communication mode between the controller and the security device is as shown in FIG. 28. When the controller performs M2M communication with the device, a controller channel address needs to be set to be the M2M address number for communication in a channel of which the channel number is the system channel number. In some preferred embodiments, the controller initiates a connection request in the M2M channel. The security device responds to the controller after receiving the connection request in the M2M channel, and the connection establishment is completed. After that, the controller and the security device can perform instruction transmission and information exchange in the M2M channel. The security device with the different channel number cannot establish a connection with the controller. The security device with the different M2M channel address number cannot receive related information sent by the controller on the M2M channel. In some preferred embodiments, the communication mode of the M2M is adapted to a point-to-point communication manner between the security device and the controller. For example, in some cases, the controller can independently control a certain security device according to the requirements of the security system.

Figure 29:
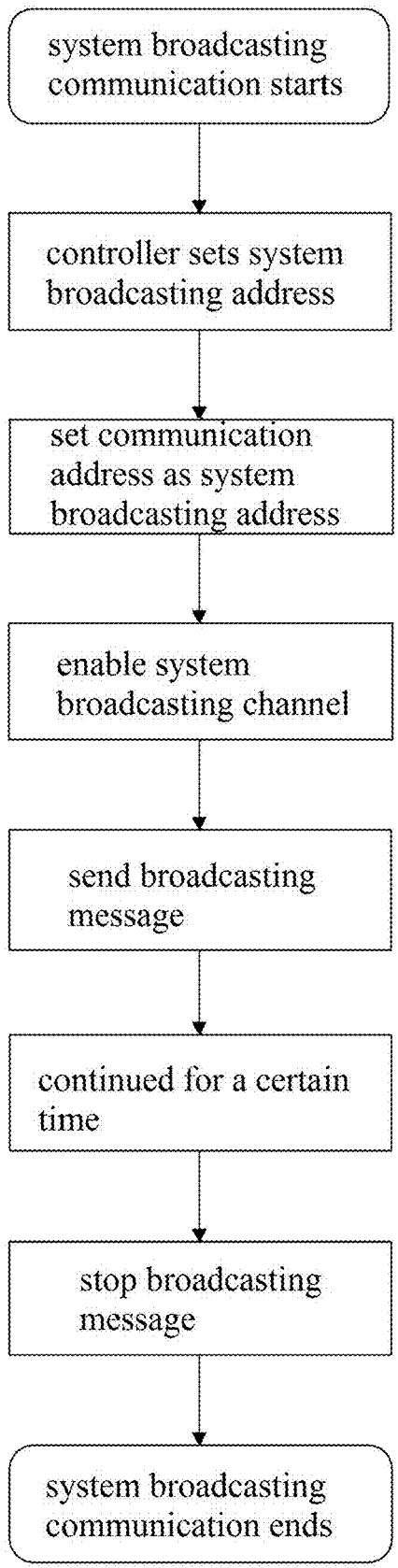
FIG. 29 is a diagram of system broadcast communication between a controller and a security device.

In some preferred embodiments, with a system broadcast communication manner between the controller and the security device, as shown in FIG. 29, when the controller and the security device perform system broadcast communication, the controller channel address needs to be set as the system broadcast address number for performing system broadcast in a channel of which the channel numbered is the system channel number. The security device receives a system broadcast sent by the controller in the system broadcast channel and then acts accordingly. The security devices with the different channel numbers cannot receive system broadcast information. The security device with the different system broadcast channel address number cannot receive system broadcast information in the system broadcast channel. In some preferred embodiments, the security devices with the same system broadcast address number but the different security broadcast address numbers or the different M2M address numbers all can receive the system broadcast information in the system broadcast channel. In some preferred embodiments, the communication manner of the system broadcast is applicable to a wide communication method between the security device and the controller (e.g., one-to-many, point-to-point, etc.). For example, in some cases, according to the requirements of the security system, the controller can control a plurality of the security devices simultaneously.

Figure 30:
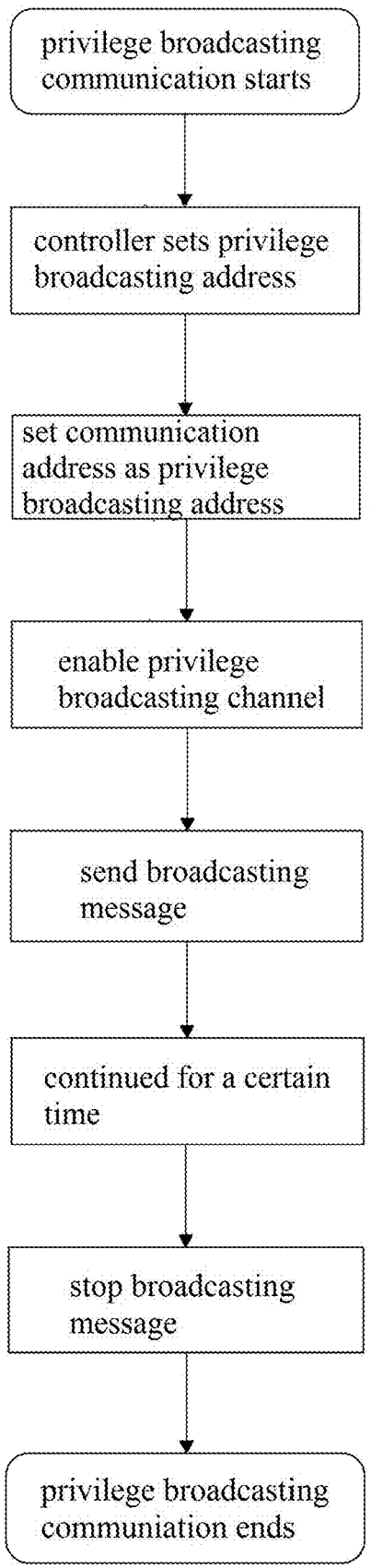
FIG. 30 is a diagram of privilege broadcast communication between a controller and a security device.

In some preferred embodiments, with a privilege broadcast communication manner between the controller and the security device, as shown in FIG. 30, when the controller and the security device perform privilege broadcast communication, the controller channel address needs to be set as the privilege broadcast address number for performing the privilege broadcast in the channel of which the channel number is the system channel number. The security device receives the privilege broadcast sent by the controller in the privilege broadcast channel and then acts accordingly. The security devices with the different channel numbers cannot receive the privilege broadcast information. The security device with different privilege broadcast channel address numbers cannot receive the privilege broadcast information in the privilege broadcast channel. In some preferred embodiments, the security broadcast devices with the same broadcast address number but the different M2M address numbers can receive the privilege broadcast information in the privilege broadcast channel. In some preferred embodiments, the privilege broadcast communication manner is suitable for a privileged communication method between the security device and the controller.

In some preferred embodiments, as shown in FIG. 31, a communication data packets of the controller and the security device may comprise a preamble, an address number, a packet control code, and a payload and a check. In some preferred embodiments, as shown in FIG. 32-34, the payload in the data packet may comprise a source device code, a command word, and data. In some preferred embodiments, the communication between the controller and the security device is implemented by packetizing, delivering, receiving, and unpacking the data packets.

What is claimed is:

1. A touch-type control system for merchandise security, comprising:
    a controller and a monitor device communicating via a specific system identification code, the system identification code comprising a channel number and an address number, the address number comprising a communication code, a device code, and a privilege code,
    the monitor device has an identifiable communication interface communicable with the controller, and is configured to be communicable with the controller via the identifiable communication interface and to be initialized by the controller in communication therewith;
    the controller also comprises a touch-type communication interface for communicating with the monitor device, is configured to be capable of controlling the monitor device initialized by the controller via the touch-type communication interface;
    the controller comprises operations of locking, unlocking, placing in an operable state, and/or placing in an inoperable state;
    wherein the controller comprises at least one main controller and at least one auxiliary controller, the auxiliary controller controls a certain type of the monitor device, and the main controller controls a plurality of types of monitor devices.

2. The touch-type control system for merchandise security according to claim 1, wherein the identifiable communication interface is a wireless communication interface.

3. The touch-type control system for merchandise security according to claim 1, wherein the touch-type communication interface is a wired communication interface.

4. The touch-type control system for merchandise security according to claim 1, wherein the touch-type communication interface is configured to be communicable via non-directional contact of an outer surface or a portion of the outer surface.

5. The touch-type control system for the merchandise security according to claim 1, wherein the touch-type communication interface comprises at least two contact points.

6. The touch-type control system for merchandise security according to claim 5, wherein at least one of the two contact points is an annular or circular contact point.

7. The touch-type control system for merchandise security according to claim 1, wherein the controller is configured to be capable of powering the monitor device via the touch-type communication interface.

8. The touch-type control system for merchandise security according to claim 7, wherein the touch-type communication interface comprises at least one identification circuit for identifying the monitor device.

9. The touch-type control system for merchandise security according to claim 8, wherein the monitor device comprises at least one characteristic circuit identifiable by the identification circuit.

10. The touch-type control system for merchandise security according to claim 1, wherein the main controller is configured to be communicable with a terminal device and capable of being set by the terminal device; the main controller is configured to set a control range, and the auxiliary controller within the control range of the main controller is configured to be connected to the terminal device through the main controller, and set by the terminal device after the main controller is set.

11. The touch-type control system for merchandise security according to claim 1, wherein the communication code is lower 2 Bytes of a serial number built into the controller.

12. The touch-type control system for merchandise security according to claim 1, wherein the privilege code is a system preset value comprising a regional privilege, a merchandise category privilege, and a control personnel privilege.

13. The touch-type control system for merchandise security according to claim 1, wherein the address number comprises three grades of address numbers: a system broadcast address number, a privilege broadcast address number, and an M2M address number; and wherein the M2M address number is used for point-to-point communication; the privilege broadcast address number is used to communicate with a security device in a certain area, a security device associated with a certain class/brand of merchandise, or a security device that belongs to a certain administrative privilege; and the system broadcast address number is used to communicate with all security devices in the entire system.

14. The touch-type control device for merchandise security, comprising:

at least one controller, configured to have a touch-type communication interface, and configured to identify and initialize a monitor device via the touch-type communication interface, and to control or power the initialized monitor device, the at least one controller and the monitor device communicating via a specific system identification code, the system identification code comprising a channel number and an address number, the address number comprising a communication code, a device code, and a privilege code; wherein the communication interface is configured to be communicable by non-directional contact of an outer surface or a portion of an outer surface;

wherein the controller comprises at least one main controller and at least one auxiliary controller, the auxiliary controller controls a certain type of the monitor device, and the main controller controls a plurality of types of monitor devices.

15. The touch-type control device for merchandise security according to claim 14, wherein the touch-type communication interface comprises at least two contact assemblies, at least one of which is a magnetic contact assembly configured to be capable of being attracted and moved by a magnetic field.

16. The touch-type control device for merchandise security according to claim 15, wherein the controller comprises a housing, the magnetic contact assembly is mounted to the housing and has a contact surface exposed to the housing.

17. The touch-type control device for merchandise security according to claim 15, wherein the magnetic contact assembly comprises a resilient element.

18. The touch-type control device for merchandise security according to claim 15, wherein at least one of the contact assemblies is an annular contact assembly and/or a circular contact assembly.

19. The touch-type control device for merchandise security according to claim 18, wherein the annular contact assembly and the circular contact assembly are nested.

* * * * *